US012693193B2

(12) United States Patent
Watanabe et al.

(10) Patent No.: US 12,693,193 B2
(45) Date of Patent: Jul. 28, 2026

(54) MANUFACTURING DATA ANALYSIS DEVICE AND METHOD

(71) Applicant: KABUSHIKI KAISHA TOSHIBA, Tokyo (JP)

(72) Inventors: Wataru Watanabe, Tokyo (JP); Keisuke Kawauchi, Kawasaki Kanagawa (JP); Takayuki Itoh, Kawasaki Kanagawa (JP); Jumpei Ando, Yokohama Kanagawa (JP); Toshiyuki Ono, Kawasaki Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 566 days.

(21) Appl. No.: 18/175,810

(22) Filed: Feb. 28, 2023

(65) Prior Publication Data

US 2024/0094092 A1 Mar. 21, 2024

(30) Foreign Application Priority Data

Sep. 15, 2022 (JP) ................................. 2022-147312

(51) Int. Cl.
*G01M 99/00* (2011.01)

(52) U.S. Cl.
CPC .................................... *G01M 99/00* (2013.01)

(58) Field of Classification Search
None
See application file for complete search history.

(56) References Cited

U.S. PATENT DOCUMENTS

| | | | |
|---|---|---|---|
| 10,521,193 B2 | 12/2019 | Tasaki | |
| 11,436,769 B2 | 9/2022 | Watanabe et al. | |

(Continued)

FOREIGN PATENT DOCUMENTS

| | | |
|---|---|---|
| JP | 4368905 B2 | 11/2009 |
| JP | 4413673 B2 | 2/2010 |

(Continued)

OTHER PUBLICATIONS

Japan Patent Office, Office Action in JP Patent App. No. 2022-147312 (Sep. 30, 2025).

*Primary Examiner* — Matthew G Marini
(74) *Attorney, Agent, or Firm* — Finnegan, Henderson, Farabow, Garrett & Dunner, LLP

(57) ABSTRACT

According to one embodiment, a manufacturing data analysis device includes processing circuitry. The processing circuitry acquires, from manufacturing data related to a plurality of products, first manufacturing data under a first acquisition condition. The first manufacturing data includes manufacturing condition data related to a manufacturing condition for each of the products and quality data related to quality for each of the products. The processing circuitry determines a second acquisition condition different from the first acquisition condition based on the first manufacturing data. The processing circuitry acquires second manufacturing data including the manufacturing condition data and the quality data from the manufacturing data under the second acquisition condition. The processing circuitry calculates an analysis result of a relationship between the manufacturing condition data and the quality data by analyzing the second manufacturing data. The processing circuitry generates output data including the analysis result.

20 Claims, 16 Drawing Sheets

(56)  References Cited

U.S. PATENT DOCUMENTS

| 2005/0251365 A1 | 11/2005 | Matsushita et al. |
| 2007/0094196 A1* | 4/2007 | Shirai .................... G06Q 50/04 |
| | | 706/46 |
| 2008/0219544 A1 | 9/2008 | Tasaki et al. |
| 2008/0278495 A1 | 11/2008 | Minamide et al. |
| 2020/0341454 A1* | 10/2020 | Mizoguchi ............. G05B 23/02 |
| 2022/0083033 A1 | 3/2022 | Ando et al. |
| 2022/0100630 A1* | 3/2022 | Himono .............. G06F 11/3409 |
| 2022/0188307 A1 | 6/2022 | Watanabe et al. |
| 2023/0055892 A1 | 2/2023 | Watanabe et al. |
| 2023/0081798 A1 | 3/2023 | Itoh et al. |
| 2023/0244210 A1 | 8/2023 | Kawauchi et al. |
| 2024/0085899 A1 | 3/2024 | Ando et al. |

FOREIGN PATENT DOCUMENTS

| JP | 5014500 B1 | 8/2012 |
| JP | 5186956 B2 | 4/2013 |
| JP | 5866446 B2 | 2/2016 |
| JP | 2017-130025 A | 7/2017 |
| JP | 2021-71896 A | 5/2021 |
| JP | 2022-49395 A | 3/2022 |
| JP | 2022-92419 A | 6/2022 |
| JP | 2023-28393 A | 3/2023 |
| JP | 2023-43703 A | 3/2023 |
| JP | 2023-113024 A | 8/2023 |
| JP | 2024-41510 A | 3/2024 |
| WO | WO 2015/118946 A1 | 8/2015 |
| WO | WO 2021/015093 A1 | 1/2021 |

* cited by examiner

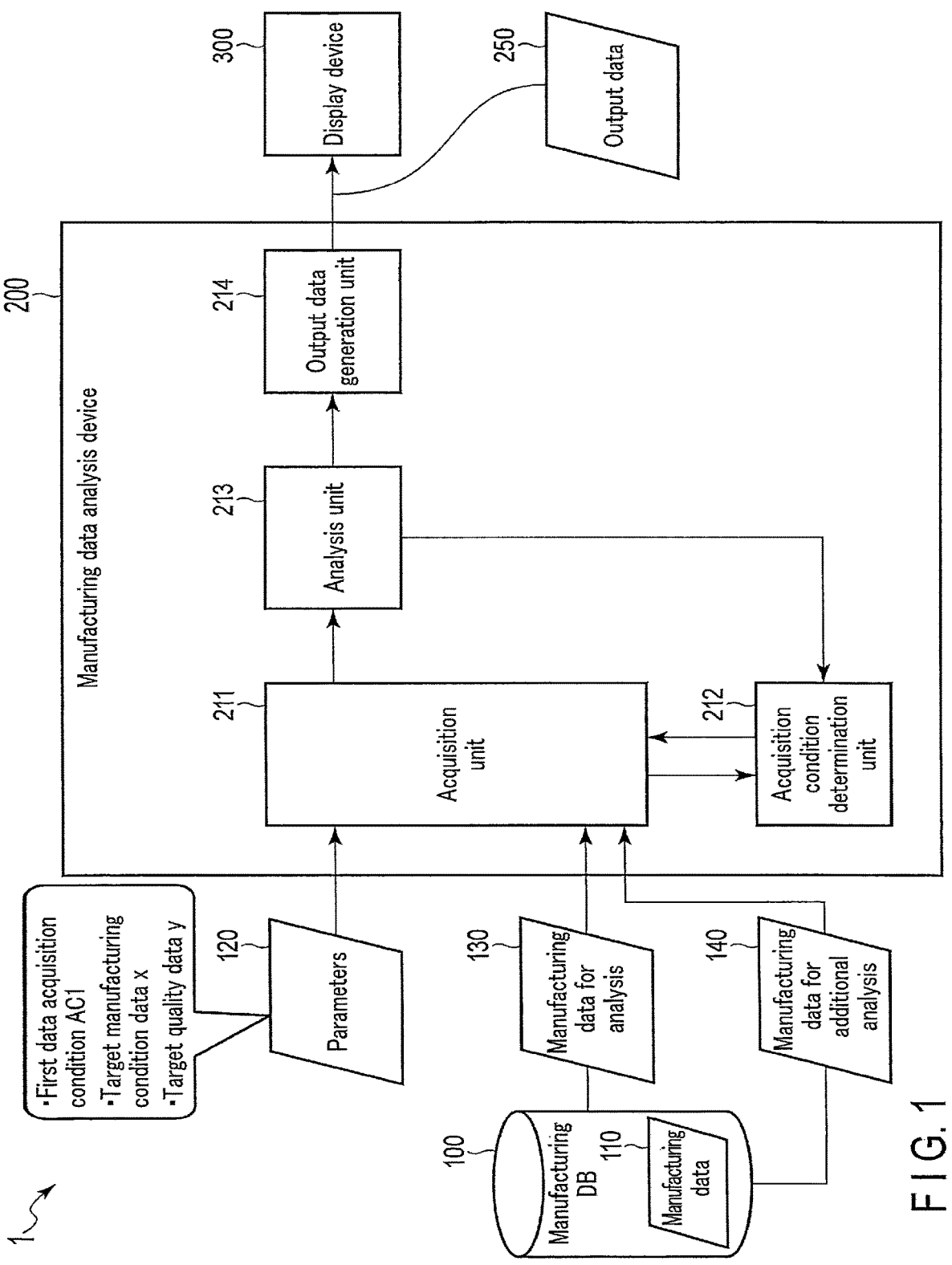
F I G. 1

FIG. 3

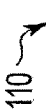
110

| Product number | Processing/ inspection time | Lot number | Manufacturing condition data C1 | Manufacturing condition data C2 | Manufacturing condition data C3 | Manufacturing condition data C4 | Manufacturing condition data C5 | Quality data C6 | Quality data C7 |
|---|---|---|---|---|---|---|---|---|---|
| XXXX-00001 | 2022/03/03 12:00:00 | XXXX-1 | A-1 | B-1 | 0.1 | A | 6 | 3.048503 | 0.685569195 |
| XXXX-00002 | 2022/03/03 12:00:01 | XXXX-1 | A-2 | B-1 | 0.1 | A | 1 | 6.746109 | 0.811569125 |
| XXXX-00003 | 2022/03/03 12:00:02 | XXXX-1 | A-2 | B-2 | 0.1 | B | 3 | 15.6339 | 0.53926036 |
| XXXX-00004 | 2022/03/03 12:00:04 | XXXX-1 | A-2 | B-2 | 0.1 | B | 2 | 9.064419 | 0.419434119 |
| XXXX-00005 | 2022/03/03 12:00:05 | XXXX-1 | A-2 | B-2 | 0.2 | A | 3 | 9.905023 | 0.980853061 |
| XXXX-00006 | 2022/03/03 12:00:06 | XXXX-1 | A-3 | B-3 | 0.1 | A | 3 | 6.192628 | 0.073292815 |
| XXXX-00007 | 2022/03/03 12:00:07 | XXXX-1 | A-4 | B-3 | 0.1 | A | 2 | 19.02925 | 0.992334542 |
| XXXX-00008 | 2022/03/03 12:00:08 | XXXX-1 | A-4 | B-3 | 0.1 | B | 3 | 5.080155 | 0.779452378 |
| XXXX-00009 | 2022/03/03 12:00:09 | XXXX-2 | A-4 | B-4 | 0.2 | B | 3 | 17.26971 | 0.578714341 |
| XXXX-00010 | 2022/03/03 12:00:10 | XXXX-2 | A-4 | B-4 | 0.2 | A | 5 | 20.73367 | 0.344663241 |
| XXXX-00011 | 2022/03/03 12:00:11 | XXXX-2 | A-5 | B-5 | 0.2 | A | 5 | 2.158379 | 0.644458571 |
| XXXX-00012 | 2022/03/03 12:00:12 | XXXX-2 | A-5 | B-5 | 0.2 | A | 2 | 17.29534 | 0.000000001 |
| XXXX-00013 | 2022/03/03 12:00:13 | XXXX-2 | A-6 | B-6 | 0.1 | B | 3 | 7.844933 | 0.132842057 |
| XXXX-00014 | 2022/03/03 12:00:14 | XXXX-2 | A-6 | B-6 | 0.2 | B | 3 | 1.035118 | 0.736797137 |
| XXXX-00015 | 2022/03/03 12:00:15 | XXXX-2 | A-7 | B-7 | 0.2 | A | 3 | 14.23491 | 0.189504253 |
| XXXX-00016 | 2022/03/03 12:00:16 | XXXX-2 | A-7 | B-7 | 0.2 | B | 3 | 19.02193 | 0.136445121 |
| XXXX-00017 | 2022/03/03 12:00:17 | XXXX-2 | A-8 | B-8 | 0.2 | B | 4 | 18.14844 | 0.999321151 |

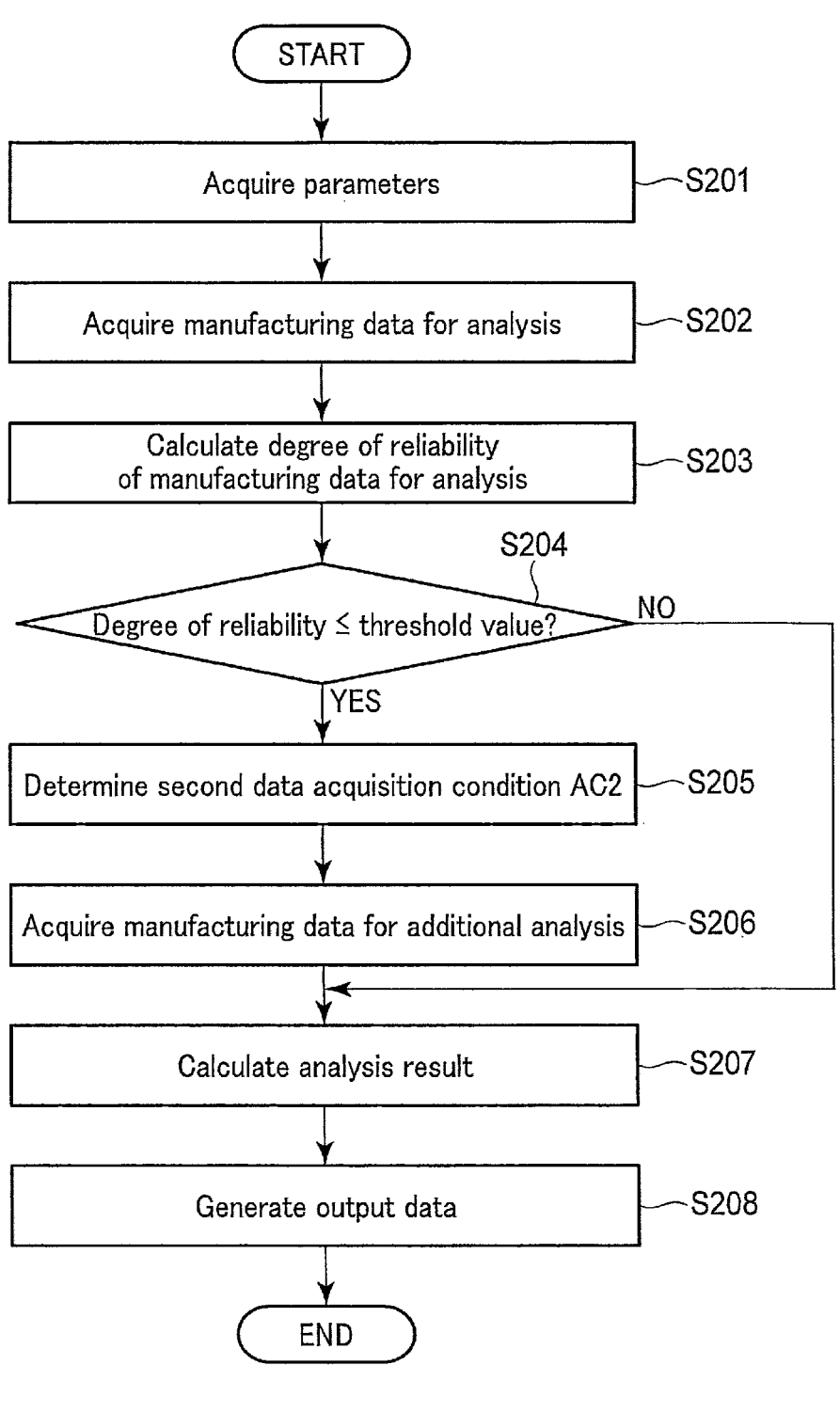
F I G. 4

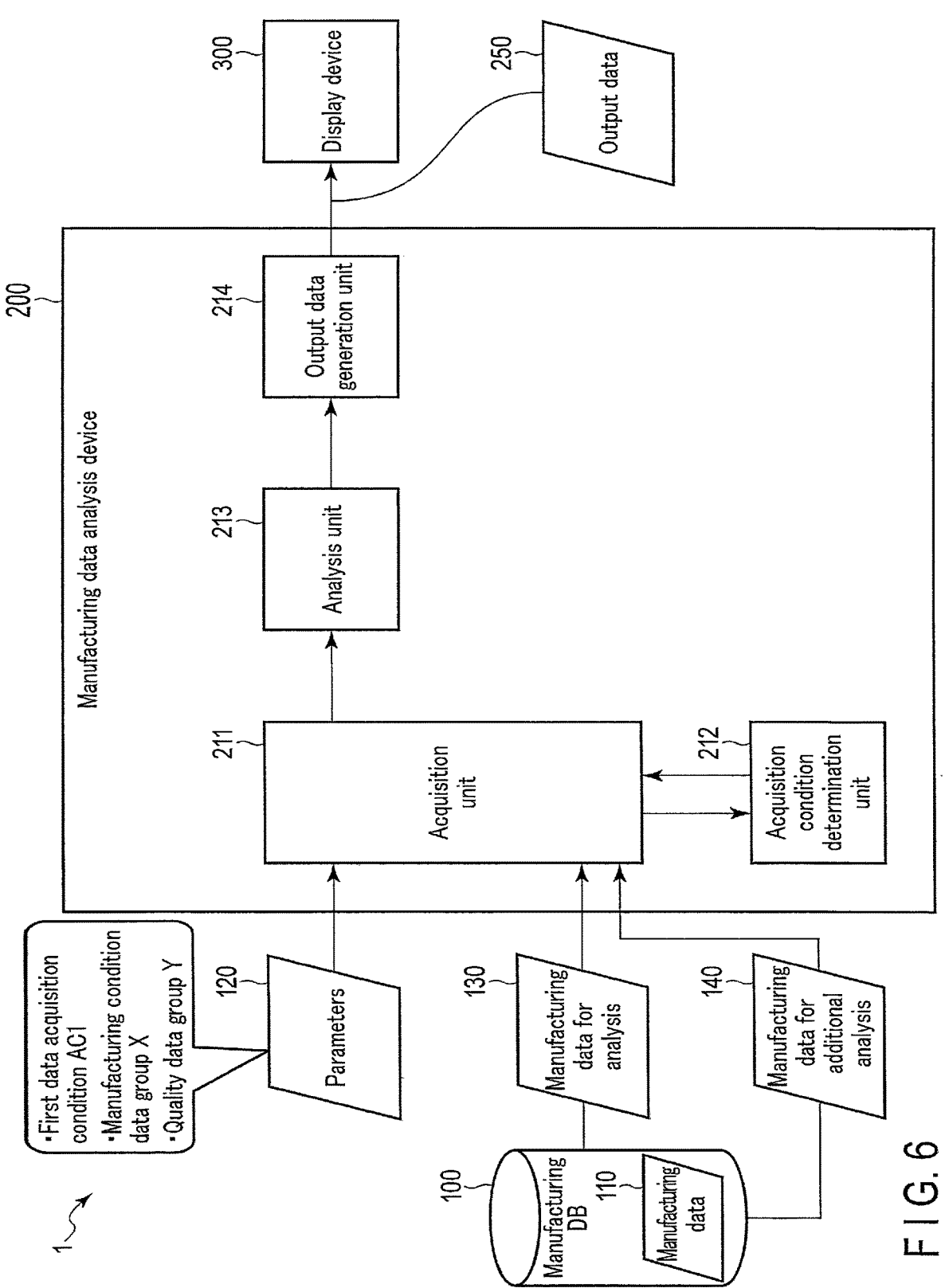
F I G. 6

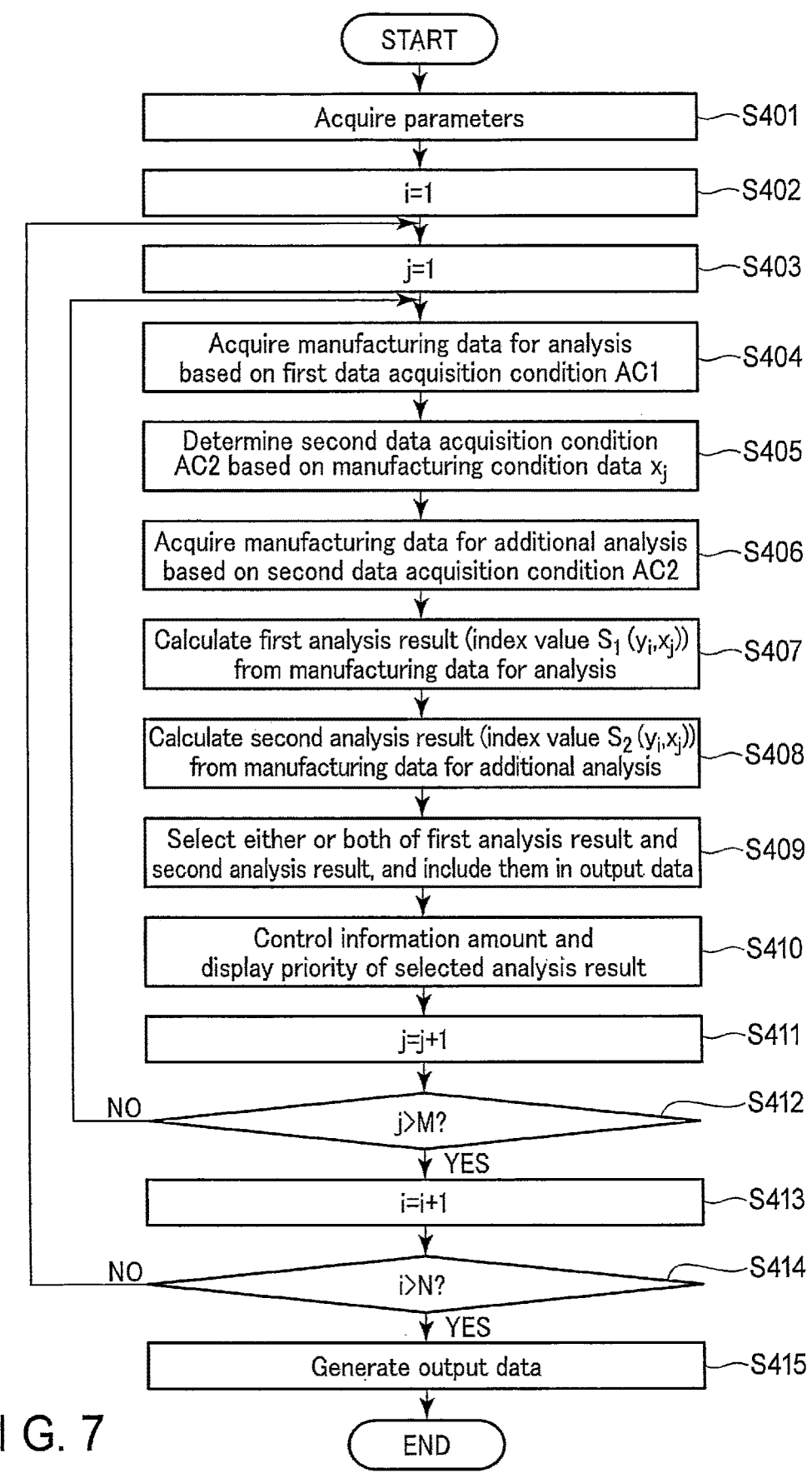
F I G. 7

350
510
610
520
530
Index value: 0.1
Index value: 0.8
Index value: 0.7
Index value: 0.2
Index value < 0.1
Index value: 0.03
Index value: 0.01
Index value < 0.001
413
513
612
611
Factor C5    511    512
Factor C3
Factor C1 et al.
412
Display for product state
G(Yi)
TH1
TH2
ID
Yi
411
Inspection item Y7
2019/07/xx
Inspection item Y4
Inspection item Y2
Inspection item Y1 et al.
400
410
420
430
440
F I G. 8

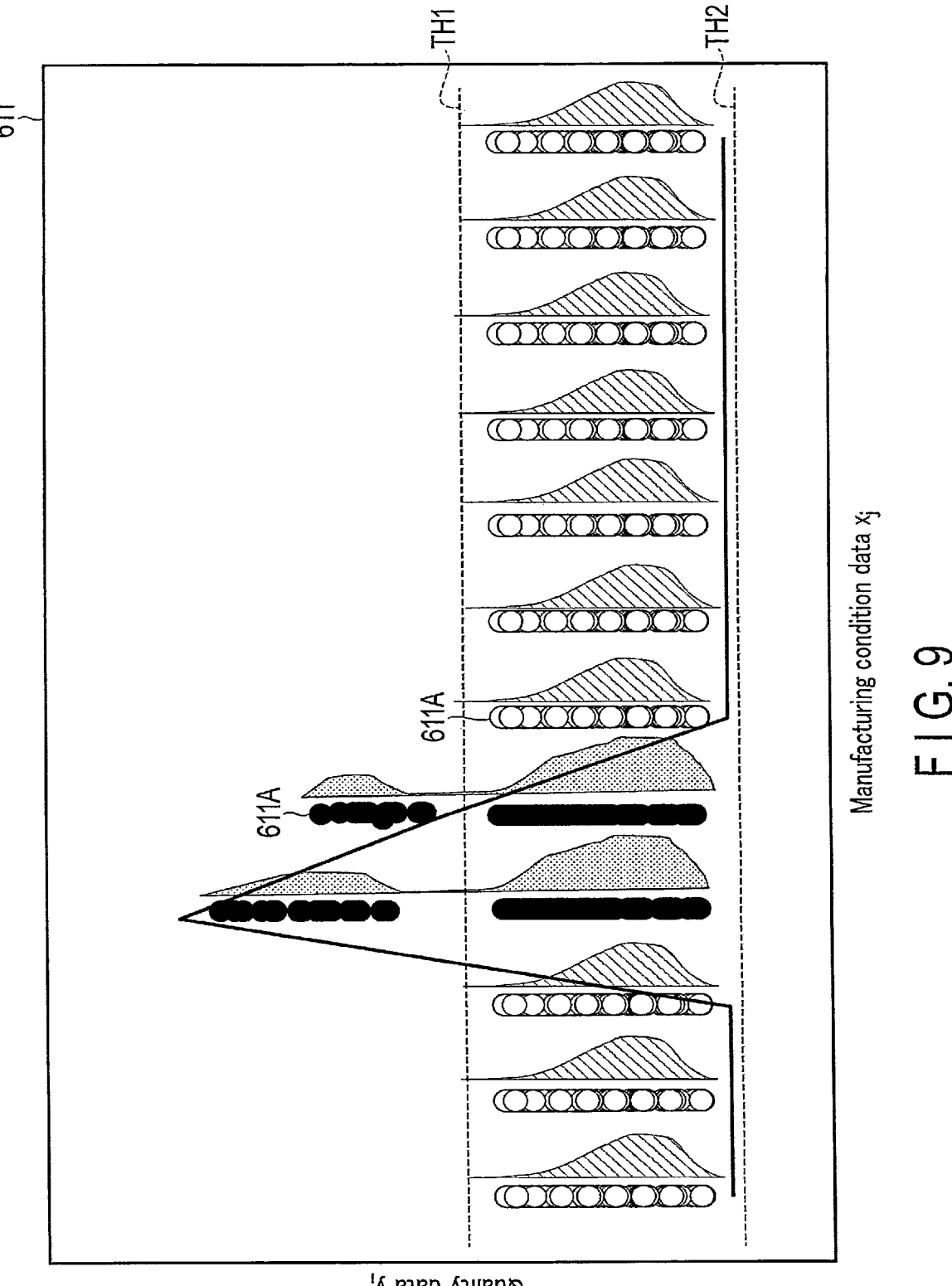
F I G. 9

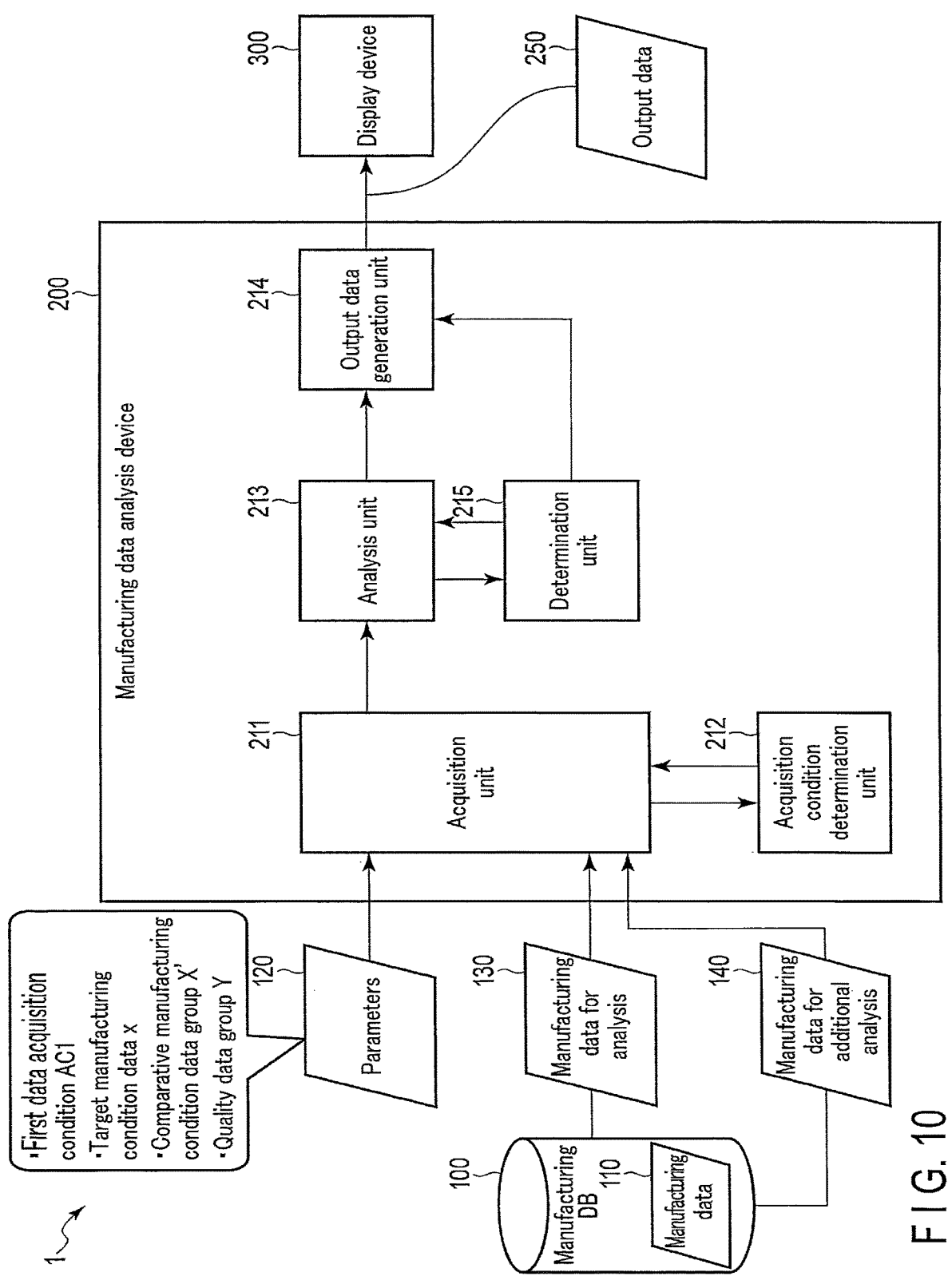
F I G. 10

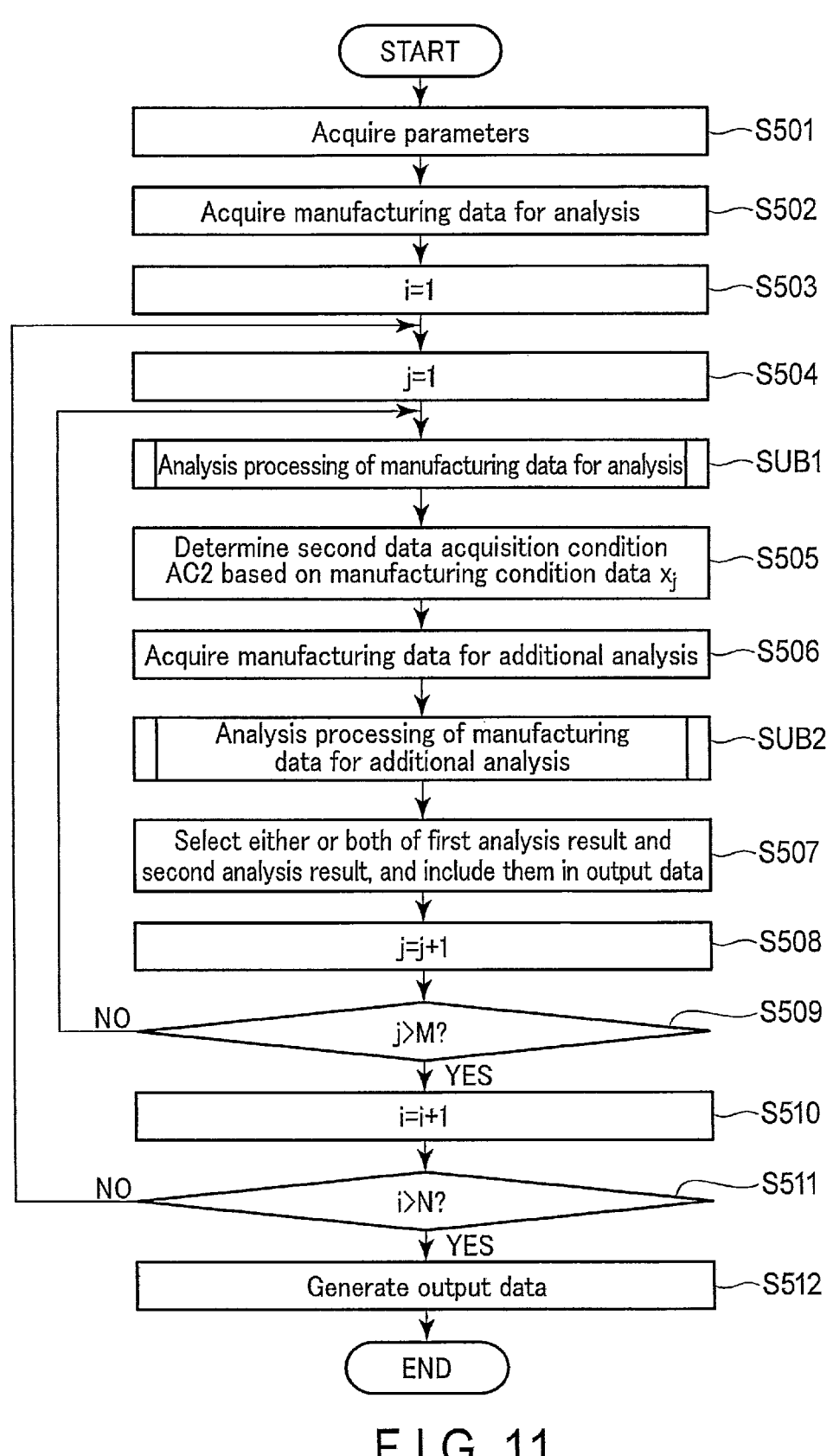
F I G. 11

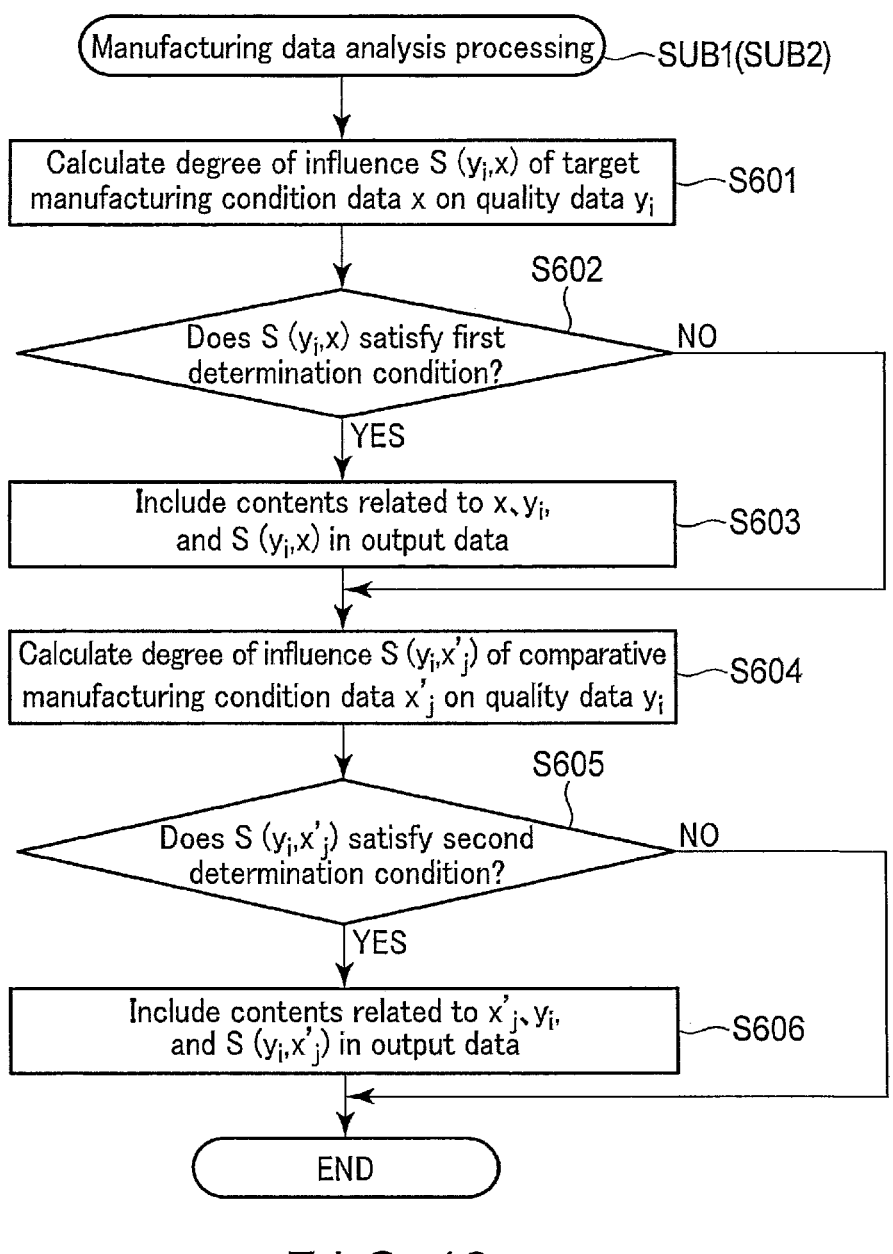
F I G. 12

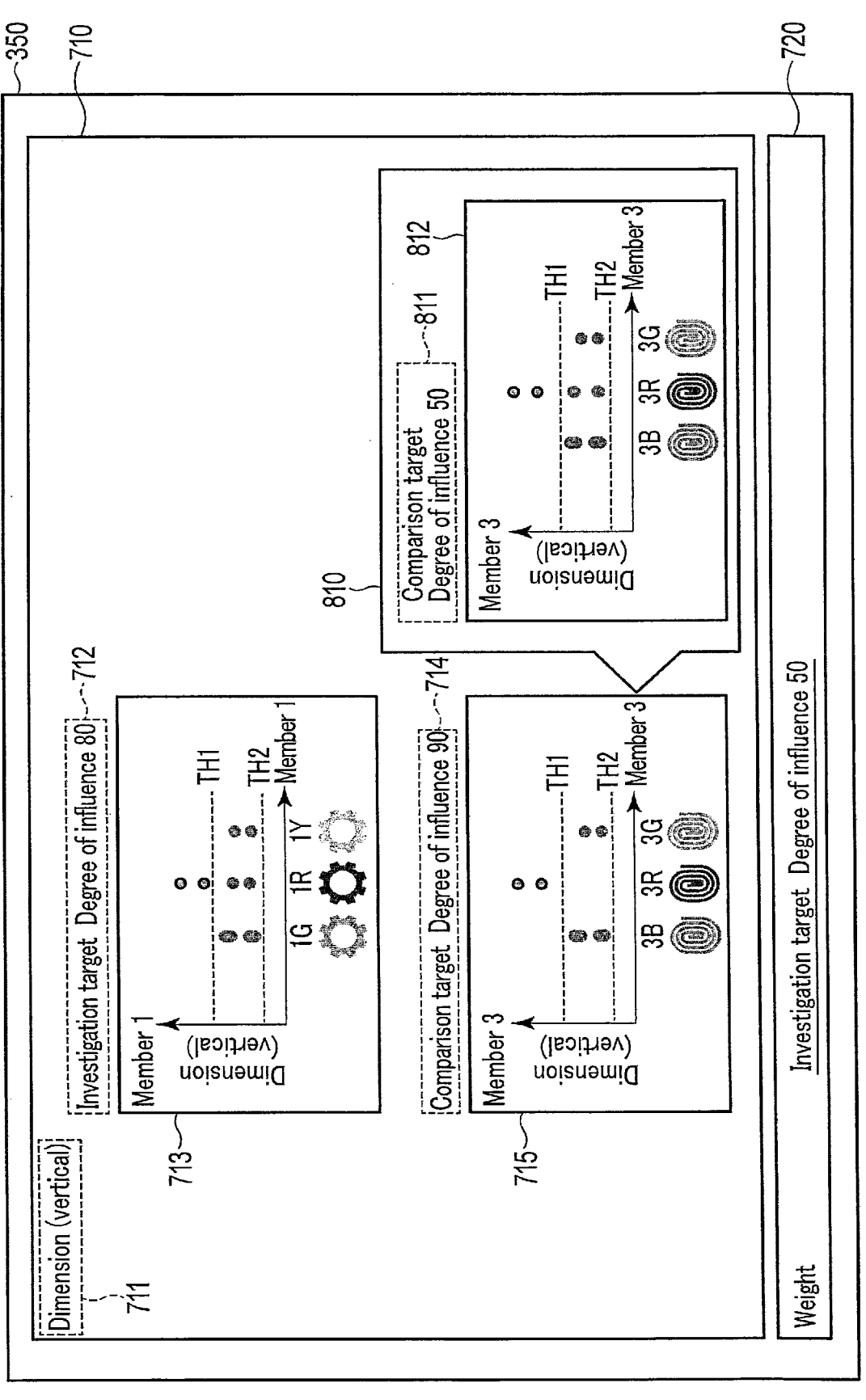
F I G. 13

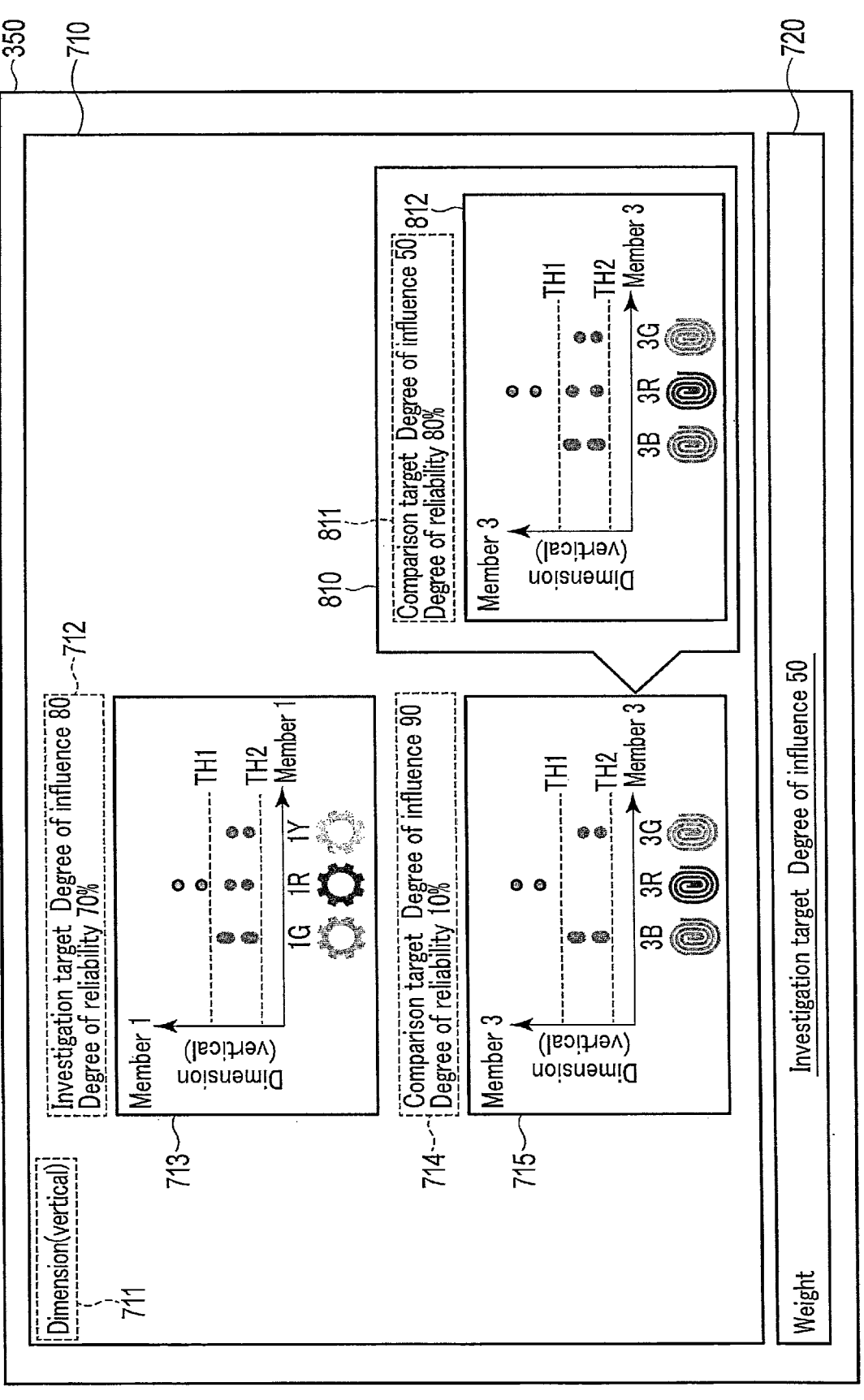
F I G. 14

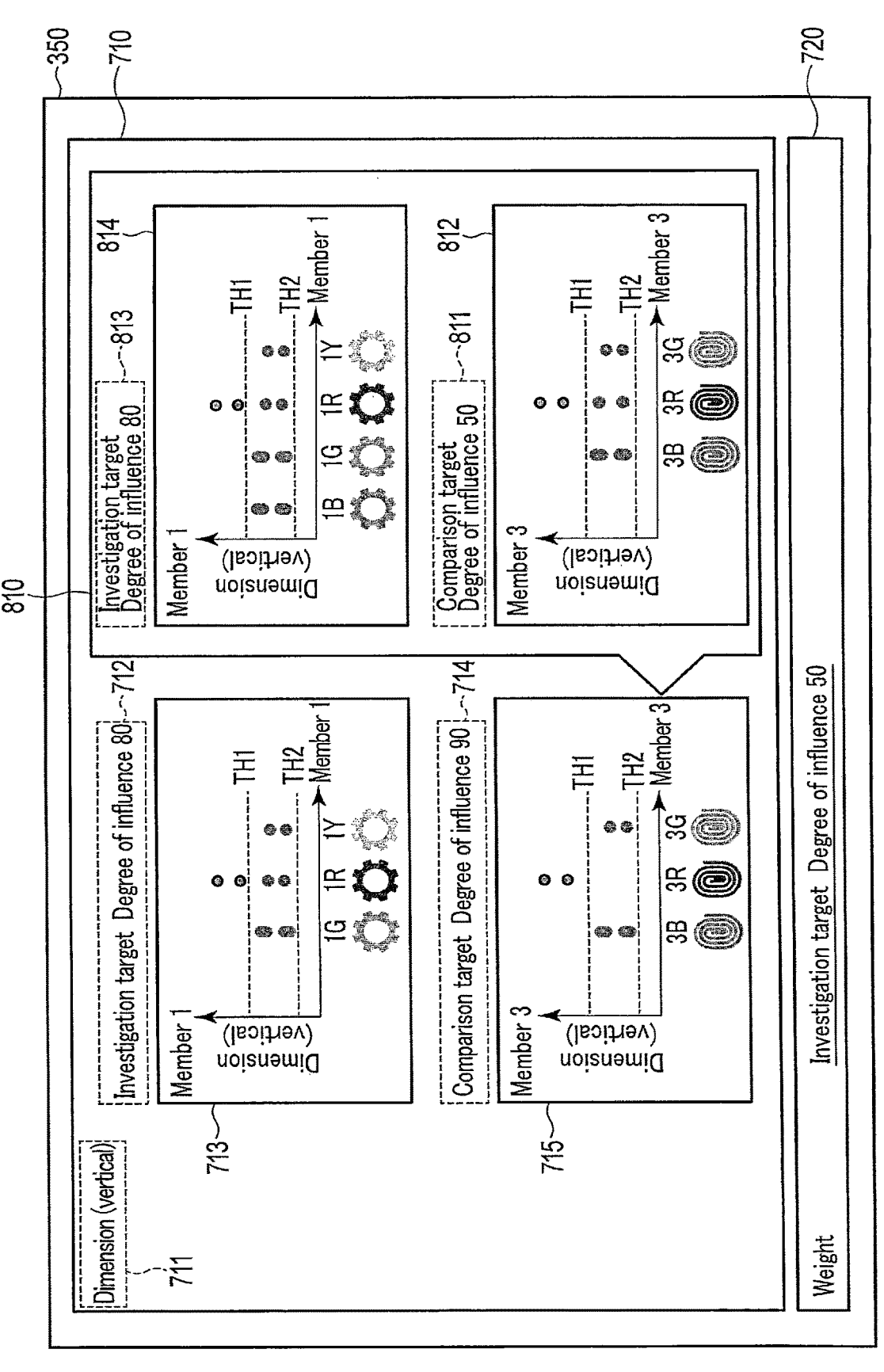
F I G. 15

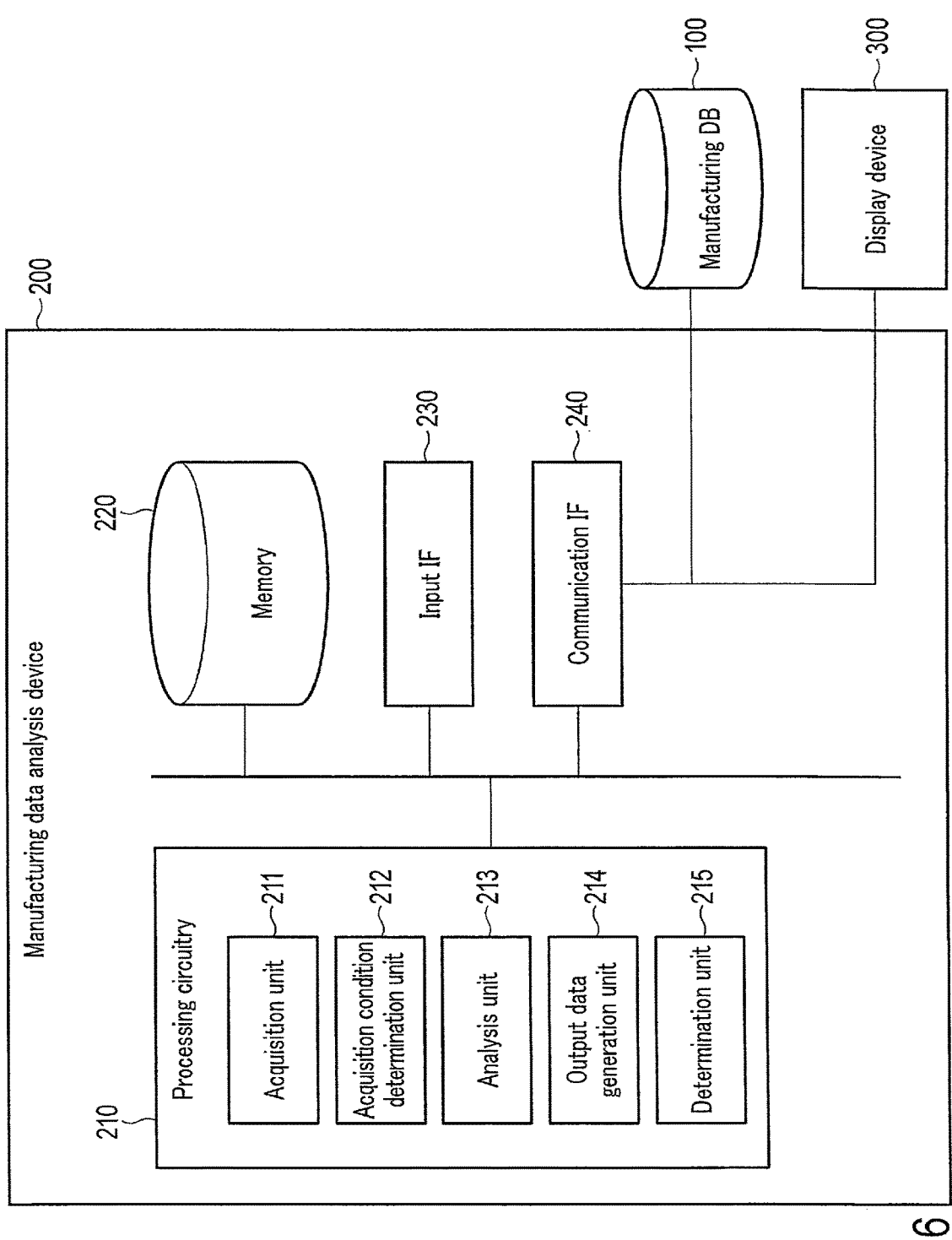
F I G. 16

MANUFACTURING DATA ANALYSIS DEVICE AND METHOD

CROSS-REFERENCE TO RELATED APPLICATIONS

This application is based upon and claims the benefit of priority from Japanese Patent Application No. 2022-147312, filed Sep. 15, 2022, the entire contents of which are incorporated herein by reference.

FIELD

Embodiments described herein relate generally to a manufacturing data analysis device and a method.

BACKGROUND

In the manufacturing industry, early identification of a cause of a particular condition of a product is important. For example, if a product is in an anomalous state that differs from a normal state, early identification of a cause thereof will lead to maintenance and improvement of a yield. Many manufacturing companies detect anomalies in their products and identify causes of the anomalies by monitoring various data (manufacturing data) acquired during a manufacturing process of their products.

The content of manufacturing data varies. For example, data on manufacturing conditions of a product (manufacturing condition data) includes names of materials and devices used in manufacturing of the product. In addition, data on the quality of a product (quality data) includes a size, physical characteristics, and a visual quality of the product.

By monitoring the quality data of products, anomalies in the products and manufacturing devices can be detected. For example, if a value of a piece of quality data differs from a usual value for some products in a group of products manufactured during a certain period of time, those products are suspected to have an anomaly. Furthermore, if it is identified that the products in question were manufactured by a particular device based on manufacturing condition data on the products, that device could be a cause of the anomaly.

The more processes and devices required to complete a product, the more data that needs to be monitored. In addition, with the recent development of Internet of Things (IoT) technology, various manufacturing data can be easily acquired. As a result, the number of manufacturing data has increased significantly, and it is difficult to manually monitor the manufacturing data. Therefore, a device to assist a user in monitoring the manufacturing data is required.

For example, it is necessary for a manufacturing data analysis device to specify an acquisition condition for manufacturing data to be analyzed when analyzing a relationship between manufacturing condition data and quality data of a product. Here, in manufacturing data acquired under an acquisition condition specified by the user, reliability of an analysis result of the aforementioned relationship decreases if, for example, the number of pieces of data (number of samples) having some values among a plurality of values that manufacturing condition data can take is relatively small. In this case, the user must modify the acquisition condition for the manufacturing data, which becomes troublesome for the user. Furthermore, the analysis device may fail to detect or over-detect the relationship between the manufacturing condition data and the quality data.

BRIEF DESCRIPTION OF THE DRAWINGS

FIG. 1 is a block diagram showing a functional configuration example of a manufacturing data analysis system according to a first embodiment.

FIG. 3 is a diagram showing an example of manufacturing data according to the first embodiment.

FIG. 4 is a flowchart showing a second operation example of the manufacturing data analysis device according to the first embodiment.

FIG. 6 is a block diagram showing a functional configuration example of a manufacturing data analysis system according to a second embodiment.

FIG. 7 is a flowchart showing an operation example of a manufacturing data analysis device according to the second embodiment.

FIG. 8 is a diagram showing a display example of a whole image based on output data according to the second embodiment.

FIG. 9 is a diagram showing a display example of a part of the image based on the output data according to the second embodiment.

FIG. 10 is a block diagram showing a functional configuration example of a manufacturing data analysis system according to a third embodiment.

FIG. 11 is a flowchart showing an operation example of a manufacturing data analysis device according to the third embodiment.

FIG. 12 is a flowchart showing an example of manufacturing data analysis processing according to the third embodiment.

FIG. 13 is a diagram showing a first display example of an image based on output data according to the third embodiment.

FIG. 14 is a diagram showing a second display example of the image based on the output data according to the third embodiment.

FIG. 15 is a diagram showing a third display example of the image based on the output data according to the third embodiment.

FIG. 16 is a block diagram showing a hardware configuration example of the manufacturing data analysis system according to the first to third embodiments.

DETAILED DESCRIPTION

Figure 2:
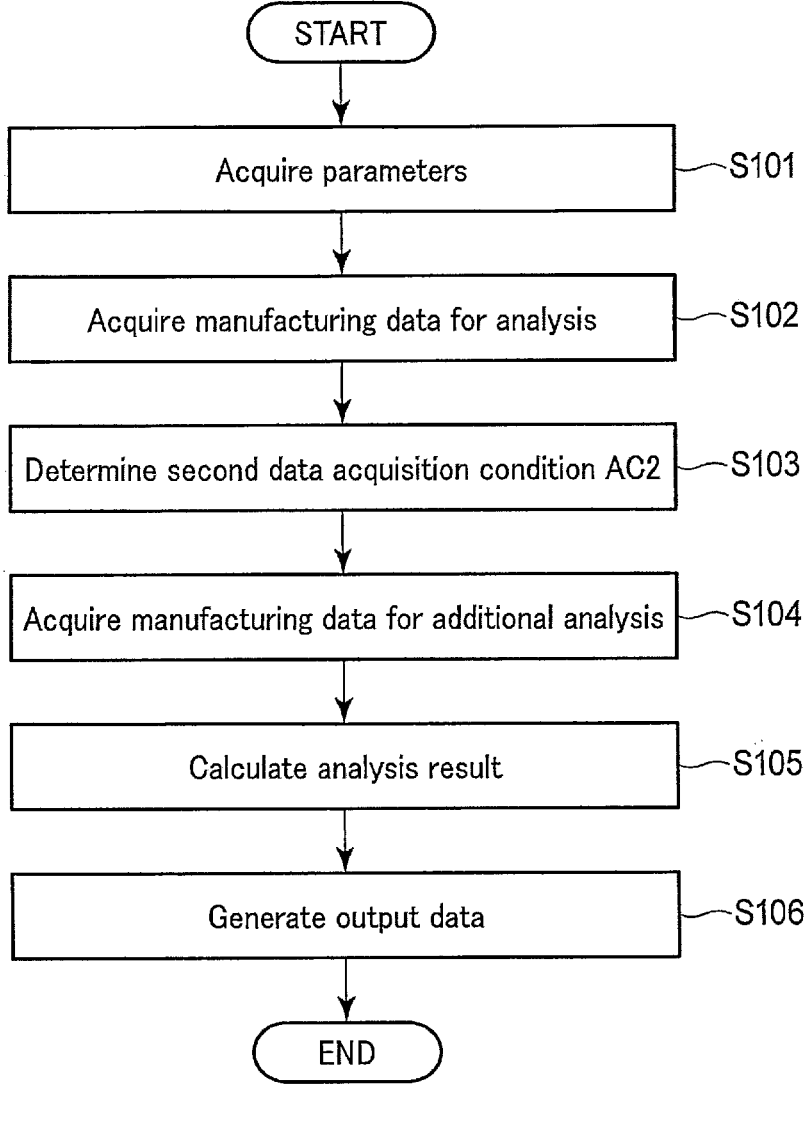
FIG. 2 is a flowchart showing a first operation example of a manufacturing data analysis device according to the first embodiment.

In general, according to one embodiment, a manufacturing data analysis device includes processing circuitry. The processing circuitry acquires, from manufacturing data related to a plurality of products, first manufacturing data under a first acquisition condition. The first manufacturing data includes manufacturing condition data related to a value indicating a manufacturing condition for each of the products and quality data related to a value indicating quality for each of the products. The processing circuitry determines a second acquisition condition different from the first acquisition condition based on the first manufacturing data. The processing circuitry acquires second manufacturing data including the manufacturing condition data and the quality data from the manufacturing data under the second acquisition condition. The processing circuitry calculates an analysis result of a relationship between the manufacturing condition data and the quality data by analyzing the second manufacturing data. The processing circuitry generates output data including the analysis result.

A manufacturing data analysis device and a method according to embodiments will be described below with reference to the drawings. In the following embodiments, elements assigned with the same reference signs are assumed to perform the same operations, and redundant descriptions thereof will be omitted as appropriate.

First Embodiment

FIG. 1 is a block diagram showing a functional configuration example of a manufacturing data analysis system 1 according to a first embodiment. The manufacturing data analysis system 1 is a system that performs quality control of products by analyzing various data (hereinafter referred to as "manufacturing data") acquired in a manufacturing process of the products. For example, the manufacturing data analysis system 1 detects anomalies in products and identifies causes of the anomalies by analyzing the manufacturing data. The manufacturing data analysis system 1 includes a manufacturing DB 100, a manufacturing data analysis device 200, and a display device 300.

The manufacturing DB 100 is, for example, a relational database management system (RDBMS) that stores manufacturing data 110 provided by manufacturing plants. The manufacturing DB 100 may be, for example, a NoSQL-based database or a file in a predetermined format (e.g., CSV). The manufacturing data 110 stored in the manufacturing DB 100 includes, for example, a few thousand or more items. "DB" means "database".

The manufacturing DB 100 updates the stored manufacturing data 110, for example, in a case where manufacturing data 110 is provided by a manufacturing plant. The manufacturing DB 100 also outputs part or all of the stored manufacturing data 110 as manufacturing data 130 for analysis or manufacturing data 140 for additional analysis to the manufacturing data analysis device 200 upon request of the manufacturing data analysis device 200.

The manufacturing data 110 includes information for identifying each individual or group of individuals of products (e.g., ID, serial number), data on manufacturing conditions of a product (hereinafter referred to as "manufacturing condition data"), and data on product quality (hereinafter referred to as "quality data"). These pieces of information or data can include continuous or discrete numerical values and category values.

The information for identifying each individual or group of individuals of products includes, for example, a product number, a time the product is processed or inspected, and a number or string of characters (e.g., lot number, lot ID) representing a fixed period or fixed number of product units. Note that "lot" is rephrased as "batch". This identification information may be associated with the manufacturing condition data and the quality data.

The manufacturing condition data includes a plurality of items such as, for example, a name of a material used for a product and a name of a device used to process or assemble the product. The manufacturing condition data may also be information about 5M1E (Man, Machine, Material, Method, Measurement, Environment), more commonly known as the six factors for manufacturing process management. Specifically, the manufacturing condition data may be a name of a processor (Man), a device name, a production line name, and a state of a device (temperature, pressure, etc.) during processing (Machine), an ID and a name of a material or part (Material), a type of processing method or processing program (Method), a name of a device that performs measurement and a measurement point (Measurement), a name of a building, a temperature, and a humidity (Environment). The manufacturing condition data may be anything else that the user determines to be useful for analysis and visualization.

The quality data are measurement values related to, for example, size (dimensions), weight, electrical characteristics, and physical characteristics of a product, and include a plurality of items. Some or all of the measurement values of the quality data are measurement values related to inspection items used in product shipment determination. The quality data is not limited to the measurement values themselves, but may also be results of some determination. Specifically, the quality data can be an integer value of a five-level evaluation for whether the product is good or bad, a binary flag determining whether the product is good or bad (e.g., bad/good), or the like. The quality data may be anything else that the user determines to be useful for analysis and visualization. As a matter of course, the quality data may also be a result of determination by a predetermined determination method (e.g., threshold processing) from data such as product size, weight, and characteristics.

Parameters 120 are parameters that control an operation of the manufacturing data analysis device 200. The parameters 120 are specified, for example, by the user of the manufacturing data analysis device 200 or an external system, and are input to the manufacturing data analysis device 200 as a file in a predetermined format (e.g., CSV). The parameters 120 may be data names in the manufacturing data 110. In particular, if the manufacturing data 110 is data in a table format, the parameters 120 may be column names of this table. The parameters 120 include a first data acquisition condition AC1, target manufacturing condition data x, and target quality data y.

The first data acquisition condition AC1 is a condition for the manufacturing data analysis device 200 to acquire the manufacturing data 130 for analysis from the manufacturing data 110 stored in the manufacturing DB 100. That is, the manufacturing data analysis device 200 acquires specific data corresponding to the first data acquisition condition AC1 as the manufacturing data 130 for analysis from the manufacturing data 110. The first data acquisition condition AC1 is, for example, a specific value related to identification information, manufacturing condition data, or quality data included in the manufacturing data 110, or a range of this value. That is, the first data acquisition condition AC1 may be at least one value included in at least one of the identification information, manufacturing condition data, or quality data. The first data acquisition condition AC1 is also rephrased as a first analysis range.

Firstly, if the first data acquisition condition AC1 is the identification information, the first data acquisition condition AC1 is, for example, a specific product number, a list of specific product numbers, a specific time or time period when a product is processed or inspected, or a specific lot number. Secondly, if the first data acquisition condition AC1 is the manufacturing condition data, the first data acquisition condition AC1 is, for example, a specific material name or device name, or a list of material names or device names. Third, if the first data acquisition condition AC1 is the quality data, the first data acquisition condition AC1 is, for example, a specific value or range related to size, weight, electrical characteristics, or physical characteristics of a product. As a matter of course, the first data acquisition condition AC1 may be a combination of these pieces of information or data. For example, the first data acquisition condition AC1 is a specific lot number and a specific material name.

The target manufacturing condition data x is manufacturing condition data that is a subject of the user's attention and is also manufacturing condition data to be analyzed by the manufacturing data analysis device 200. The target manufacturing condition data x is specified, for example, from one of the plurality of pieces of manufacturing condition data included in the manufacturing data 110. Each of the pieces of manufacturing condition data included in the manufacturing data 110 may be sequentially specified as the target manufacturing condition data x each time the manufacturing data analysis device 200 performs analysis processing.

The target quality data y is quality data that is a subject of the user's attention and is also quality data to be analyzed by the manufacturing data analysis device 200. The target quality data y is specified, for example, from one of the plurality of pieces of quality data included in the manufacturing data 110. Each of the pieces of quality data included in the manufacturing data 110 may be sequentially specified as the target quality data y each time the manufacturing data analysis device 200 performs analysis processing.

The first data acquisition condition AC1 may be a specific value among a plurality of values included in the target manufacturing condition data x. For example, if the target manufacturing condition data x is data on a specific material name (e.g., a gear), this data will include a plurality of values (e.g., gear A, gear B, and gear C) with different manufacturers, manufacturing dates, processing conditions, characteristics, etc. In this case, the first data acquisition condition AC1 may be one or more specific values (e.g., gear A and gear C) among the plurality of values. Such a first data acquisition condition AC1 is suitable for the manufacturing data analysis device 200 to investigate a degree of influence exerted by a difference in the specific values on the target quality data y.

Similarly, the first data acquisition condition AC1 may be a specific range of values among a plurality of values included in the target quality data y. For example, if the target quality data y is data on a size of a product, this data includes a predetermined value range (e.g., 1 cm to 20 cm). In this case, the first data acquisition condition AC1 may be a specific value range (e.g., 5 cm to 10 cm) out of the predetermined value range.

The manufacturing data analysis device 200 is a device that analyzes manufacturing data to generate output data 250 including various analysis results. For example, the manufacturing data analysis device 200 outputs the output data 250 including results of analyzing the manufacturing data 130 for analysis and the manufacturing data 140 for additional analysis acquired from the manufacturing DB 100 to the display device 300. The manufacturing data analysis device 200 includes an acquisition unit 211, an acquisition condition determination unit 212, an analysis unit 213, and an output data generation unit 214.

The acquisition unit 211 acquires manufacturing data 130 for analysis including the target manufacturing condition data x and the target quality data y from the manufacturing data 110 included in the manufacturing DB 100 under the first data acquisition condition AC1 based on externally input parameters 120. At this time, for identification of a group of products included in an analysis range, the acquisition unit 211 may include information for identifying each individual or group of individuals of products in the manufacturing data 130 for analysis. The acquisition unit 211 outputs the manufacturing data 130 for analysis to the acquisition condition determination unit 212 and the analysis unit 213. The acquisition unit 211 is an example of a first acquisition unit.

The acquisition condition determination unit 212 determines an acquisition condition (second data acquisition condition AC2) of the manufacturing data 110 so as to reduce bias in a plurality of values included in the target manufacturing condition data x or the target quality data y in the manufacturing data 130 for analysis input from the acquisition unit 211. Here, the second data acquisition condition AC2 is different from the first data acquisition condition AC1. For example, the second data acquisition condition AC2 is a range including part or all of the first data acquisition condition AC1. The second data acquisition condition AC2 may also be a condition to acquire a greater number of pieces of data than the first data acquisition condition AC1 from the manufacturing data 110. The acquisition condition determination unit 212 outputs the second data acquisition condition AC2 to the acquisition unit 211.

The acquisition unit 211 acquires manufacturing data 140 for additional analysis including the target manufacturing condition data x and the target quality data y from the manufacturing data 110 included in the manufacturing DB 100 under the second data acquisition condition AC2 input from the acquisition condition determination unit 212. At this time, for identification of product groups included in an analysis range, the acquisition unit 211 may include information for identifying each individual or group of individuals of products in the manufacturing data 140 for additional analysis. The acquisition unit 211 outputs the manufacturing data 140 for additional analysis to the analysis unit 213. The acquisition unit 211 is an example of a second acquisition unit.

The analysis unit 213 analyzes at least one of the manufacturing data 130 for analysis or the manufacturing data 140 for additional analysis input from the acquisition unit 211, and calculates an analysis result of a relationship between the target manufacturing condition data x and the target quality data y. For example, the analysis unit 213 calculates an index value S (y, x) indicating a strength of the relationship between the target manufacturing condition data x and the target quality data y. The index value S (y, x) is, for example, a value indicating a possibility (causality) that the target manufacturing condition data x is a cause of variations in the target quality data y. The analysis unit 213 outputs the index value S (y, x) as an analysis result to the output data generation unit 214.

The output data generation unit 214 generates output data 250 based on the analysis result input from the analysis unit 213. For example, the output data generation unit 214 generates output data 250 including at least one of the analysis result of the manufacturing data 130 for analysis or the analysis result of the manufacturing data 140 for additional analysis. The output data generation unit 214 may include data names of the target manufacturing condition data x and the target quality data y, as well as the index value S (y, x) in the output data 250, as the analysis result. The output data generation unit 214 may also include values, representative values, statistical values, histograms, scatter diagrams, etc. of the target manufacturing condition data x and the target quality data y in the output data 250. The output data generation unit 214 outputs the output data 250 to the display device 300.

The output data 250 is data including a result of analysis by the manufacturing data analysis device 200. The output data 250 may be data in a format (e.g., CSV, HTML, XML, JSON) that can be displayed on the display device 300. That is, the output data 250 may be various text data, text files, image data, or image files. Alternatively, the output data 250 may be stored in a dedicated database.

The display device 300 is a device that displays an image based on the output data 250 input from the manufacturing data analysis device 200. For example, if the output data 250 is text data or a text file, the display device 300 may display this data on a text editor. On the other hand, if the output data 250 is image data or an image file, the display device 300 may display this data on a browser or on an image viewer. The display device 300 may also acquire output data 250 stored in a dedicated database from this database and display the output data 250. Furthermore, the display device 300 may convert structured text data (e.g., CSV, JSON) into HTML data or image data by a predetermined method and display the data.

FIG. 2 is a flowchart showing a first operation example of the manufacturing data analysis device 200 according to the first embodiment. This operation example can be initiated when the user of the manufacturing data analysis device 200 or an external system inputs the parameters 120 into the manufacturing data analysis device 200.

(Step S101) First, the manufacturing data analysis device 200 acquires, by the acquisition unit 211, a first data acquisition condition AC1, target manufacturing condition data x, and target quality data y as the parameters 120.

(Step S102) Next, the manufacturing data analysis device 200 acquires, by the acquisition unit 211, manufacturing data 130 for analysis from the manufacturing data 110 included in the manufacturing DB 100 based on the parameters 120.

FIG. 3 is a diagram showing an example of the manufacturing data 110 according to the first embodiment. In this example, the manufacturing data 110 is shown as data in a table format. Here, a vertical direction of the manufacturing data 110 is referred to as columns and a horizontal direction as rows. In this case, a column direction of the manufacturing data 110 shows data items (types). On the other hand, a row direction of the manufacturing data 110 shows individual products. That is, values of individual cells of the manufacturing data 110 show values of various data for each product.

Specifically, the first through third columns from the left of the manufacturing data 110 include product identification information (product number, processing/inspection time, and lot number). The fourth through eighth columns from the left of the manufacturing data 110 include manufacturing condition data (C1 to C5). The ninth and tenth columns of the manufacturing data 110 include quality data (C6 and C7). Here, each of the plurality of values included in the manufacturing condition data or quality data is associated with each of the plurality of values included in the product identification information. For example, in the manufacturing data 110, if the manufacturing condition data C1 is specified as the target manufacturing condition data x and the quality data C6 as the target quality data y, the manufacturing condition data C1 and the quality data C6 are included in the manufacturing data 130 for analysis.

The manufacturing data 110 includes various data on D products. For example, the target manufacturing condition data x and the target quality data y are a list (vector) of length D. In this example, D=17.

(Step S103) Subsequently, the manufacturing data analysis device 200 determines, by the acquisition condition determination unit 212, a second data acquisition condition AC2 based on the manufacturing data 130 for analysis.

Firstly, if the first data acquisition condition AC1 is a condition relating to a period of time or a date and time, the acquisition condition determination unit 212 may also determine a period of time or date and time that precedes or follows that period of time or date and time as the second data acquisition condition AC2. For example, if the first data acquisition condition AC1 is "a product whose processing time is between a predetermined one hour period (e.g., 12:00-13:00)," the acquisition condition determination unit 212 may determine a time including a one hour period before and after that predetermined one hour (e.g., 11:00-14:00) as the second data acquisition condition AC2. As a matter of course, the acquisition condition determination unit 212 may alternately determine a time including only an hour before or an hour after that predetermined one hour (e.g., 11:00-13:00, 12:00-14:00) as the second data acquisition condition AC2.

The second data acquisition condition AC2 may not be contiguous with the period of time or date and time of the first data acquisition condition AC1. For example, if the first data acquisition condition AC1 is "a product whose processing time is during a predetermined one-day period (e.g., Mar. 3, 2022)," the acquisition condition determination unit 212 may determine a past period of time that is not contiguous with that predetermined one-day period (e.g., Feb. 28 to Mar. 1, 2022) as the second data acquisition condition AC2. In addition, the second data acquisition condition AC2 may be a period of time with an interval of every other week, every other month, every other year, etc. As a matter of course, the second data acquisition condition AC2 may be any other conditions.

Secondly, if the first data acquisition condition AC1 is a condition relating to identification information of the product, the acquisition condition determination unit 212 may determine identification information of a product different from the aforementioned identification information as the second data acquisition condition AC2. For example, if the first data acquisition condition AC1 is a predetermined lot number, the acquisition condition determination unit 212 may determine a lot number different from that predetermined lot number as the second data acquisition condition AC2. For example, if the order of each product is specified by lot number in the manufacturing data 110, the acquisition condition determination unit 212 may determine a condition including a lot number (e.g., XXXX-1, XXXX-3) that is one or more orders ahead or behind a predetermined lot number (e.g., XXXX-2) as the second data acquisition condition AC2.

Further, the acquisition condition determination unit 212 may determine the second data acquisition condition AC2 based on a value that the target manufacturing condition data x or the target quality data y included in the manufacturing data 130 for analysis acquired under the first data acquisition condition AC1 can take. For example, if the value that the target manufacturing condition data x can take in the manufacturing data 130 for analysis is any one of A1, A2, and A3, the acquisition condition determination unit 212 may determine, as the second data acquisition condition AC2, a condition to acquire a greater number of pieces of data pertaining to that one of the values A1, A2, and A3 than when the first data acquisition condition AC1 is used. Alternatively, the acquisition condition determination unit 212 may determine a condition to acquire all the data pertaining to that one of the values A1, A2, and A3 as the second data acquisition condition AC2.

Further, if the target manufacturing condition data x or the target quality data y is qualitative data, the acquisition condition determination unit 212 may determine the second data acquisition condition AC2 so that the number of pieces of data for each type of values included in this qualitative data is equal to or greater than a predetermined threshold value. This threshold value can be set to any value by the user. This allows the acquisition condition determination unit 212 to reduce bias in distribution of the plurality of values included in the target manufacturing condition data x or the target quality data y.

If the target manufacturing condition data x or the target quality data y are continuous values, the acquisition condition determination unit 212 may determine the second data acquisition condition AC2 based on a plurality of values included in the target manufacturing condition data x or the target quality data y or a distribution of the plurality of values. Specifically, the acquisition condition determination unit 212 may generate a histogram of that plurality of values, and may use a condition that includes a value with a relatively low class-based frequency in the histogram as the second data acquisition condition AC2.

Further, if the target manufacturing condition data x or the target quality data y is quantitative data, the acquisition condition determination unit 212 may determine the second data acquisition condition AC2 so that a frequency for each class of values included in this quantitative data is equal to or greater than a predetermined threshold value. This threshold value can be set to any value by the user. This allows the acquisition condition determination unit 212 to reduce bias in distribution of a plurality of values included in the target manufacturing condition data x or the target quality data y.

Further, the acquisition condition determination unit 212 may determine the second data acquisition condition AC2 if the manufacturing data 130 for analysis satisfies a predetermined condition. For example, if the number of pieces of data included in the manufacturing data 130 for analysis is smaller than a predetermined threshold value, the acquisition condition determination unit 212 may determine the second data acquisition condition AC2 so as to increase that number of pieces of data. In addition, if the number or percentage of missing or anomalous values included in the manufacturing data 130 for analysis is greater than a predetermined threshold value, the acquisition condition determination unit 212 may determine the second data acquisition condition AC2 so as to reduce that number or percentage.

Alternatively, if the number or percentage of data having a specific value in the manufacturing data 130 for analysis is smaller than a predetermined threshold value, the acquisition condition determination unit 212 may determine the second data acquisition condition AC2 so as to increase the number of pieces of data having that specific value. Specifically, if the number or percentage of data belonging to a specific category of the target manufacturing condition data x is smaller than a predetermined threshold value, the acquisition condition determination unit 212 may determine the second data acquisition condition AC2 so as to increase that number or percentage.

In addition, the acquisition condition determination unit 212 may determine the second data acquisition condition AC2 in an exploratory manner so that the second data acquisition condition AC2 satisfies a predetermined condition. For example, if the first data acquisition condition AC1 is a condition relating to a period of time or date and time, the acquisition condition determination unit 212 may expand a target period for analysis in the forward/backward direction in time based on that period of time or date and time and determine a target period that satisfies the predetermined condition as the second data acquisition condition AC2.

The acquisition condition determination unit 212 may determine whether or not analysis using a second data acquisition condition AC2 is necessary, and if it is determined to be necessary, determine the second data acquisition condition AC2. For example, if the manufacturing data 130 for analysis does not satisfy a predetermined condition, the acquisition condition determination unit 212 may determine that analysis using a second data acquisition condition AC2 is necessary. On the other hand, if this analysis is determined to be unnecessary, the acquisition condition determination unit 212 can set the second data acquisition condition AC2 to be the same as the first data acquisition condition AC1. Alternatively, the acquisition condition determination unit 212 may control the manufacturing data analysis device 200 to make the second data acquisition condition AC2 an empty set or the like so as not to acquire or generate manufacturing data 140 for additional analysis by the second data acquisition condition AC2.

(Step S104) Subsequently, the manufacturing data analysis device 200 acquires, by the acquisition unit 211, the manufacturing data 140 for additional analysis from the manufacturing data 110 included in the manufacturing DB 100 based on the second data acquisition condition AC2.

(Step S105) Subsequently, the manufacturing data analysis device 200 analyzes, by the analysis unit 213, the manufacturing data 130 for analysis and the manufacturing data 140 for additional analysis to calculate an analysis result for each piece of data. In this way, the analysis unit 213 calculates each of the analysis result of the manufacturing data 130 for analysis and the analysis result of the manufacturing data 140 for additional analysis. As described above, the index value S (y, x) indicating the strength of the relationship between the target manufacturing condition data x and the target quality data y is included in the analysis results. The index value S (y, x) indicates, for example, a possibility (causality) that the target manufacturing condition data x is a cause of variations in the target quality data y. Conversely, the index value S (y, x) may be a possibility that the target quality data y is a cause of variations in the target manufacturing condition data x.

The index value S (y, x) may be a correlation coefficient (e.g., Pearson's product-moment correlation coefficient, Spearman's rank correlation coefficient, Kendall's rank correlation coefficient, a maximal information coefficient (MIC)) of the target manufacturing condition data x and the target quality data y. In particular, if the target manufacturing condition data x and the quality data y both include category values, the index value S (y, x) may be a linkage coefficient (e.g., Goodman-Kruskal's tau, Kramer's V). If Goodman-Kruskal's tau is used for the index value S (y, x), the smaller of the two values calculated from the two data items should be used. That is, the index value S (y, x) may be a degree of similarity between the two data items.

In the present embodiment, the analysis unit 213 may calculate the index value S (y, x) by a statistical test method (e.g., a chi-square test, G-test). For example, the analysis unit 213 may use a p-value when testing a null hypothesis that "the target manufacturing condition data x does not relate to variations in the target quality data y" as the index value S (y, x). In this case, the smaller the index value S(y, x), the stronger the relationship between the target manufacturing condition data x and the target quality data y. Alternatively, the analysis unit 213 may use a 1-p value or a 1/p value as the index value S (y, x). The analysis unit 213 may use other likelihood ratio test frameworks.

In the present embodiment, the analysis unit 213 may use a regression error obtained by regression analysis on the target manufacturing condition data x and the target quality data y as the index value S (y, x). If a regression model with a small regression error (e.g., a least squares error) or a regression model with a high likelihood is obtained from the target manufacturing condition data x and the target quality data y, the analysis unit 213 may determine that the target manufacturing condition data x has influenced the target quality data y, i.e., that the relationship is strong.

Regression analysis methods used include, for example, linear regression, generalized linear regression (e.g., logistic regression, Poisson regression), basis linear regression, kernel regression, support vector regression, multilayer perceptron, regression trees, and random forests. If the target manufacturing condition data x and the target quality data y include category values, the analysis unit 213 may apply One-Hot encoding to the category values and then perform a regression analysis.

The analysis unit 213 may also estimate a causal factor related to a change factor of the target quality data y using an index different from the regression error. In general, regression errors tend to be smaller for models in which data elements with a large number of levels or combinations of a large number of data elements are used as explanatory variables. To avoid relying on this tendency, the analysis unit 213 may estimate this causal factor using a model comparison index value that takes into account a complexity of the model (e.g., the number of explanatory variables, the regularization strength in nonlinear regression) in addition to the goodness of fit of the model.

The model comparison index values include, for example, the Akaike's information criterion (AIC), the Bayesian information criterion (BIC), the widely applicable information criterion (WAIC), and Mallows' Cp. A cross-validation (e.g., one-out cross-validation, K-split cross-validation) error may also be used as another index value.

In the present embodiment, the analysis unit 213 may calculate the index value S (y, x) using a model trained by machine learning. As a matter of course, the analysis unit 213 may use other calculation methods, testing methods, or methods for calculating the index value S (y, x).

In the present embodiment, the index value S (y, x) is a continuous value, and it is assumed that the larger the value thereof is, the stronger the relationship is between the target manufacturing condition data x and the target quality data y. Conversely, if it is assumed that the smaller the index value S (y, x) is, the stronger that relationship is, the analysis unit 213 should reverse the positive and negative signs of the index value S (y, x) in the condition determination. As a matter of course, the index value S (y, x) may be a discrete value.

(Step S106) Subsequently, the manufacturing data analysis device 200 generates output data 250 including the analysis result by the output data generation unit 214. Specifically, the output data generation unit 214 generates output data 250 including at least one of the analysis result (first analysis result) of the manufacturing data 130 for analysis or the analysis result (second analysis result) of the manufacturing data 140 for additional analysis. After this process, the manufacturing data analysis device 200 ends a series of processing.

Here, the output data generation unit 214 may select at least one of the first analysis result or the second analysis result, and include the selected analysis result in the output data 250. For example, the output data generation unit 214 may compare an index value S (y, x) included in the first analysis result and an index value S (y, x) included in the second analysis result, and select the analysis result including the larger index value S (y, x). If both analysis results are included in the output data 250, the output data generation unit 214 may sort the first analysis result and the second analysis result in order of the larger or smaller index value S (y, x).

The output data generation unit 214 may set at least one condition for the value of the index value S (y, x), and change the contents to be included in the output data 250 according to a determination result of each condition. It is assumed here that the index value S (y, x) takes a value from 0 to 1, and the closer the value is to 1, the stronger the relationship is between the target manufacturing condition data x and the target quality data y. For example, the output data generation unit 214 sets a first threshold value "0.9" as a first condition and a second threshold value "0.7" as a second condition. At this time, the output data generation unit 214 may change information to be included in the output data 250 according to each case where the index value S (y, x) is (i) equal to or greater than the first threshold value, (ii) below the first threshold value and equal to or greater than the second threshold value, and (iii) below the second threshold value. Specifically, the output data generation unit 214 may include information or a flag representing a classification "warning" in case (i), "caution" in case (ii), and "no anomaly" in case (iii) in the output data 250.

FIG. 4 is a flowchart showing a second operation example of the manufacturing data analysis device 200 according to the first embodiment. Similar to the operation example in FIG. 2, the present operation example can be initiated when the user of the manufacturing data analysis device 200 or an external system inputs the parameters 120 into the manufacturing data analysis device 200.

(Step S201) First, the manufacturing data analysis device 200 acquires, by the acquisition unit 211, a first data acquisition condition AC1, target manufacturing condition data x, and target quality data y as the parameters 120. Step S201 is similar to step S101.

(Step S202) Next, the manufacturing data analysis device 200 acquires, by the acquisition unit 211, manufacturing data 130 for analysis from the manufacturing data 110 included in the manufacturing DB 100 based on the parameters 120. Step S202 is similar to step S102.

(Step S203) Subsequently, the manufacturing data analysis device 200 calculates a degree of reliability (first degree of reliability) of the manufacturing data 130 for analysis by the acquisition condition determination unit 212.

For example, the acquisition condition determination unit 212 calculates a degree of reliability from the number of pieces of data included in the manufacturing data 130 for analysis. Specifically, the acquisition condition determination unit 212 may set a predetermined threshold value for the number of pieces of data, determine the degree of reliability as "1" if the number of pieces of data is greater than this threshold value, and determine the degree of reliability as "0" if the number of pieces of data is less than this threshold value. Alternatively, the acquisition condition determination unit 212 may determine the degree of reliability as "1" if the number of pieces of data is equal to or greater than the predetermined threshold value, and calculate the degree of reliability by the formula (number of pieces of data)/(threshold value) if the number of pieces of data is less than the predetermined threshold value. In this formula, if the number of pieces of data is half of the threshold value, the degree of reliability is calculated as "0.5".

In addition, the acquisition condition determination unit 212 may calculate the degree of reliability based on the number or percentage of missing or anomalous values with respect to the number of pieces of data included in the manufacturing data 130 for analysis. For example, if 20% of the number of pieces of data are missing or anomalous values, the acquisition condition determination unit 212 may determine the degree of reliability as "0.8" based on the remaining number of pieces of data (80%) that are not missing or anomalous values.

Further, the acquisition condition determination unit 212 may calculate a degree of reliability based on the number or percentage of data having a specific value in the manufacturing data 130 for analysis. Specifically, the acquisition condition determination unit 212 may calculate a degree of reliability to be decreased if the number or percentage of data belonging to a specific category of the target manufacturing condition data x is smaller than a predetermined threshold value in the manufacturing data 130 for analysis.

Here, it is assumed that a value that the target manufacturing condition data x can take is any one of A1, A2, and A3. If each value is included in the target manufacturing condition data x in an equal proportion, a percentage thereof is about 33% (=⅓). On the other hand, if a percentage of A2 in the target manufacturing condition data x is relatively small, e.g., about 2%, the acquisition condition determination unit 212 calculates a degree of reliability to be decreased. Specifically, the acquisition condition determination unit 212 may calculate the degree of reliability by the formula 2 [%]/33[%]≈0.06, using the equal percentage of 33% as the maximum value.

Otherwise, the acquisition condition determination unit 212 may calculate the degree of reliability based on a magnitude of variation (bias) in the proportion of each value. Alternatively, the acquisition condition determination unit 212 may set the same or a different threshold value for the minimum number of each value of A1, A2, and A3 to calculate the first degree of reliability. For example, the acquisition condition determination unit 212 may set the same threshold value for the minimum number of pieces of data for each of A1, A2, and A3.

(Step S204) Here, the manufacturing data analysis device 200 determines, by the acquisition condition determination unit 212, whether or not the degree of reliability of the manufacturing data 130 for analysis is equal to or less than a predetermined threshold value. This threshold value can be set to any value by the user of the manufacturing data analysis device 200. If this determination condition is satisfied (YES in step S204), the process proceeds to step S205. On the other hand, if this determination condition is not satisfied (No in step S204), the process proceeds to step S207.

(Step S205) In this case, the manufacturing data analysis device 200 determines, by the acquisition condition determination unit 212, a second data acquisition condition AC2 based on the manufacturing data 130 for analysis. Step S205 is similar to step S103.

The acquisition condition determination unit 212 may calculate a degree of reliability (second degree of reliability) of manufacturing data 140 for additional analysis by the same method as the aforementioned calculation method of the degree of reliability (first degree of reliability) of the manufacturing data 130 for analysis. Further, the acquisition condition determination unit 212 may determine the second data acquisition condition AC2 in an exploratory manner so that the second degree of reliability satisfies a predetermined condition. For example, the acquisition condition determination unit 212 may determine the second data acquisition condition AC2 in an exploratory manner so that the second degree of reliability is higher than the first degree of reliability.

(Step S206) Subsequently, the manufacturing data analysis device 200 acquires, by the acquisition unit 211, the manufacturing data 140 for additional analysis from the manufacturing data 110 included in the manufacturing DB 100 based on the second data acquisition condition AC2. Step S206 is similar to step S104.

(Step S207) Subsequently, the manufacturing data analysis device 200 analyzes, by the analysis unit 213, the manufacturing data 130 for analysis and the manufacturing data 140 for additional analysis to calculate an analysis result for each piece of data. Step S207 is similar to step S105.

(Step S208) Subsequently, the manufacturing data analysis device 200 generates output data 250 including the analysis result by the output data generation unit 214. Step S208 is similar to step S106. The output data generation unit 214 may include the degree of reliability (first degree of reliability) in the analysis result (first analysis result) of the manufacturing data 130 for analysis, and the degree of reliability (second degree of reliability) in the analysis result (second analysis result) of the manufacturing data 140 for additional analysis. After this process, the manufacturing data analysis device 200 ends a series of processing.

Figure 5:
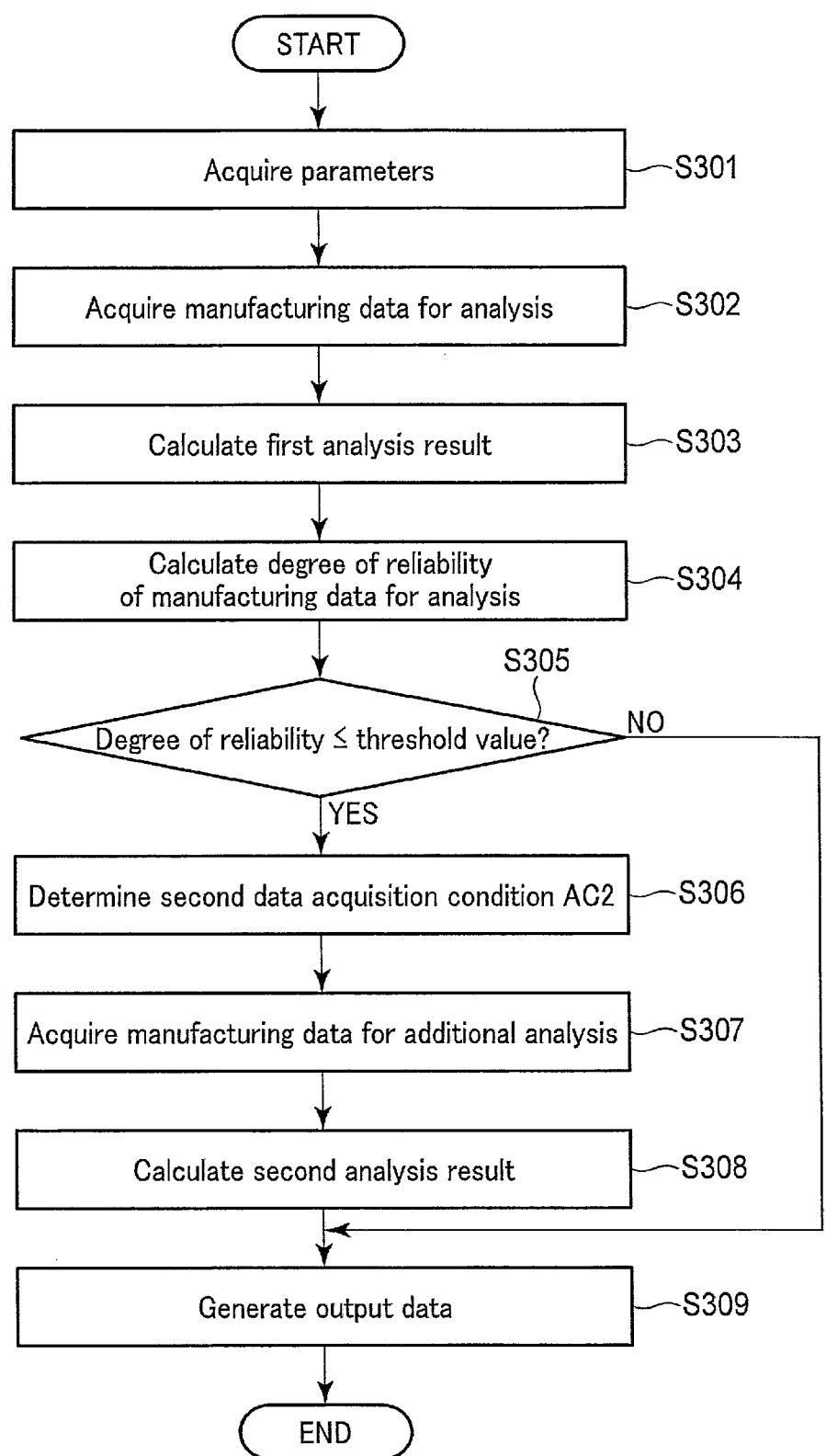
FIG. 5 is a flowchart showing a third operation example of the manufacturing data analysis device according to the first embodiment.

FIG. 5 is a flowchart showing a third operation example of the manufacturing data analysis device 200 according to the first embodiment. Similarly to the operation example in FIG. 2, the present operation example can be initiated when the user of the manufacturing data analysis device 200 or an external system inputs the parameters 120 into the manufacturing data analysis device 200.

(Step S301) First, the manufacturing data analysis device 200 acquires, by the acquisition unit 211, a first data acquisition condition AC1, target manufacturing condition data x, and target quality data y as the parameters 120. Step S301 is similar to step S101.

(Step S302) Next, the manufacturing data analysis device 200 acquires, by the acquisition unit 211, manufacturing data 130 for analysis from the manufacturing data 110 included in the manufacturing DB 100 based on the parameters 120. Step S302 is similar to step S102.

(Step S303) Subsequently, the manufacturing data analysis device 200 analyzes, by the analysis unit 213, the manufacturing data 130 for analysis to calculate an analysis result (first analysis result) for the manufacturing data 130 for analysis. The analysis unit 213 outputs the first analysis result to the acquisition condition determination unit 212 and the output data generation unit 214.

(Step S304) Subsequently, the manufacturing data analysis device 200 acquires, by the acquisition condition determination unit 212, a degree of reliability (first degree of reliability) of the manufacturing data 130 for analysis based on the first analysis result.

For example, if the analysis unit 213 calculates a correlation coefficient of the target manufacturing condition data x and the target quality data y as an index value S (y, x), the acquisition condition determination unit 212 may calculate a degree of reliability based on a p-value representing a significance of that correlation coefficient. Alternatively, the acquisition condition determination unit 212 may use a p-value itself as a degree of reliability. That is, the degree of reliability can be calculated based on various indices calculated by the analysis unit 213 from the manufacturing data 130 for analysis.

If the analysis unit 213 calculates a BIC by regression analysis as an index value S (y, x), the acquisition condition determination unit 212 may calculate a degree of reliability based on a difference ΔBIC from a BIC by a null model. Alternatively, the acquisition condition determination unit 212 may use ΔBIC itself as the degree of reliability.

In addition, if the analysis unit 213 calculates a plurality of index values S (y, x) by pseudo-increasing the number of pieces of data in the manufacturing data 130 for analysis using a bootstrap method or the like, the acquisition condition determination unit 212 may calculate the degree of reliability based on a variation (bias) in that plurality of index values S (y, x). Alternatively, the acquisition condition determination unit 212 may use that variation itself as the degree of reliability.

The acquisition condition determination unit 212 may calculate, by using any method for calculating reliability, significance, and variation of an analysis result by the analysis unit 213, a predetermined value from that analysis result and then calculate a degree of reliability based on that predetermined value, or may use that predetermined value itself as the degree of reliability.

(Step S305) Here, the manufacturing data analysis device 200 determines, by the acquisition condition determination unit 212, whether or not the degree of reliability of the manufacturing data 130 for analysis is equal to or less than a predetermined threshold value. This threshold value can be set to any value by the user of the manufacturing data analysis device 200. If this determination condition is satisfied (YES in step S305), the process proceeds to step S306. On the other hand, if this determination condition is not satisfied (No in step S305), the process proceeds to step S309.

(Step S306) In this case, the manufacturing data analysis device 200 determines, by the acquisition condition determination unit 212, a second data acquisition condition AC2 based on the manufacturing data 130 for analysis. Step S306 is similar to step S103.

(Step S307) Subsequently, the manufacturing data analysis device 200 acquires, by the acquisition unit 211, manufacturing data 140 for additional analysis from the manufacturing data 110 included in the manufacturing DB 100 based on the second data acquisition condition AC2. Step S307 is similar to step S104.

(Step S308) Subsequently, the manufacturing data analysis device 200 analyzes, by the analysis unit 213, the manufacturing data 140 for additional analysis, and calculates an analysis result (second analysis result) for the manufacturing data 140 for additional analysis. A calculation method of the second analysis result is the same as that of the first analysis result. The analysis unit 213 outputs the second analysis result to the output data generation unit 214.

(Step S309) Subsequently, the manufacturing data analysis device 200 generates output data 250 including the analysis result by the output data generation unit 214. Step S309 is similar to step S106. After this process, the manufacturing data analysis device 200 ends a series of processing.

The manufacturing data analysis system 1 according to the first embodiment has been described above. According to the first embodiment, the manufacturing data analysis device 200 outputs an analysis result by the second data acquisition condition AC2 instead of the first data acquisition condition AC1 input by the user. This allows the manufacturing data analysis device 200 to improve reliability of an analysis result of a relationship between the target manufacturing condition data x and the target quality data y, for example, in a case where the number of pieces of data having some values among values that the target manufacturing condition data x can take is relatively small.

According to the first embodiment, the manufacturing data analysis device 200 determines the second data acquisition condition AC2 with respect to the first data acquisition condition AC1 input by the user, and selects either one or both of the first analysis result and the second analysis result to generate the output data 250. This allows the manufacturing data analysis device 200 to present both of the analysis results, which differ in reliability, on the relationship between the target manufacturing condition data x and the target quality data y, for example, in a case where the number of pieces of data having some values among the values that the target manufacturing condition data x can take is relatively small. Alternatively, the manufacturing data analysis device 200 can selectively present more reliable analysis results.

Furthermore, according to the first embodiment, the manufacturing data analysis device 200 calculates a degree of reliability (first degree of reliability) of manufacturing data 130 for analysis acquired under the first data acquisition condition AC1, and determines a second data acquisition condition AC2 according to this degree of reliability. The manufacturing data analysis device 200 calculates a degree of reliability (second degree of reliability) of manufacturing data 140 for additional analysis acquired under the second data acquisition condition AC2. This allows the manufacturing data analysis device 200 to quantify a difference in an analysis result (second analysis result) of the manufacturing data 140 for additional analysis from an analysis result (first analysis result) of the manufacturing data 130 for analysis as a degree of reliability, and present that degree of reliability to the user. Therefore, the user can objectively evaluate the reliability of each of the first analysis result and the second analysis result. As described above, the manufacturing data analysis device 200 can assist the user in monitoring the manufacturing data.

Second Embodiment

FIG. 6 is a block diagram showing a functional configuration example of a manufacturing data analysis system 1 according to a second embodiment. Unlike the first embodiment, a manufacturing data analysis device 200 according to the second embodiment acquires a first data acquisition condition AC1, a manufacturing condition data group X, and a quality data group Y as the parameters 120. A configuration of the manufacturing data analysis system 1 according to the second embodiment is the same as that of the first embodiment.

FIG. 7 is a flowchart showing an operation example of the manufacturing data analysis device 200 according to the second embodiment. Similar to the operation example in FIG. 2, the present operation example can be initiated when a user of the manufacturing data analysis device 200 or an external system inputs the parameters 120 into the manufacturing data analysis device 200.

(Step S401) First, the manufacturing data analysis device 200 acquires, by the acquisition unit 211, a first data acquisition condition AC1, a manufacturing condition data group X, and a quality data group Y as the parameters 120.

The manufacturing condition data group X is a group (set) including one or more pieces of manufacturing condition data. For convenience of explanation, the number of pieces of manufacturing condition data (number of items) included in the manufacturing condition data group X will be hereinafter represented as "M". Also, each of the pieces of manufacturing condition data included in the manufacturing condition data group X will be represented as "$x_j$" (variable j=1 . . . M; j is an integer).

The quality data group Y is a group (set) including one or more pieces of quality data. For convenience of explanation, the number of pieces of quality data (number of items) included in the quality data group Y will be hereinafter represented as "N". Also, each of the pieces of quality data included in the quality data group Y will be represented as "$y_i$" (variable i=1 . . . N; i is an integer).

(Step S402) Next, the manufacturing data analysis device 200 sets the variable i to 1 (i=1) by the analysis unit 213. Specifically, the analysis unit 213 sets the variable i to 1 for the quality data $y_i$ included in the quality data group Y.

(Step S403) Subsequently, the manufacturing data analysis device 200 sets the variable j to 1 (j=1) by the analysis unit 213. Specifically, the analysis unit 213 sets the variable j to 1 for the manufacturing condition data $x_j$ included in the manufacturing condition data group X.

(Step S404) Subsequently, the manufacturing data analysis device 200 acquires, by the acquisition unit 211, manufacturing data 130 for analysis from the manufacturing data 110 included in the manufacturing DB 100 based on the first data acquisition condition AC1. At the first execution of this step, the acquisition unit 211 acquires the manufacturing data 130 for analysis for analyzing the manufacturing condition data x1 and the quality data y1 as targets.

(Step S405) Subsequently, the manufacturing data analysis device 200 determines, by the acquisition condition determination unit 212, a second data acquisition condition AC2 based on the manufacturing condition data $x_j$ included in the manufacturing data 130 for analysis. At this time, the acquisition condition determination unit 212 may determine the second data acquisition condition AC2 based on a value that the manufacturing condition data $x_j$ can take as described above.

(Step S406) Subsequently, the manufacturing data analysis device 200 acquires, by the acquisition unit 211, manufacturing data 140 for additional analysis from the manufacturing data 110 included in the manufacturing DB 100 based on the second data acquisition condition AC2. At the first execution of this step, the acquisition unit 211 acquires the manufacturing data 140 for additional analysis for analyzing the target manufacturing condition data x1 and the quality data y1 as targets.

(Step S407) Subsequently, the manufacturing data analysis device 200 calculates, by the analysis unit 213, a first analysis result (index value $S_1$ ($y_i$, $x_j$)) from the manufacturing data 130 for analysis. The index value $S_1$ ($y_i$, $x_j$) indicates, for example, a strength of a relationship between the manufacturing condition data $x_j$ and the quality data $y_i$. The index value $S_1$ ($y_i$, $x_j$) is also referred to as a first index value. The analysis process in step S407 is similar to the analysis process in step S105.

(Step S408) Subsequently, the manufacturing data analysis device 200 calculates, by the analysis unit 213, a second analysis result (index value $S_2$ ($y_i$, $x_j$)) from the manufacturing data 140 for additional analysis. The index value $S_2$ ($y_i$, $x_j$) indicates, for example, a strength of a relationship between the manufacturing condition data $x_j$ and the quality data $y_i$. The index value $S_2$ ($y_i$, $x_j$) is also referred to as a second index value. The analysis process in step S408 is similar to the analysis process in step S105.

(Step S409) Subsequently, the manufacturing data analysis device 200 selects, by the output data generation unit 214, either one or both of the first analysis result and the second analysis result, and includes the selected analysis result in output data 250. The selection process in step S409 is similar to the selection process in step S106.

(Step S410) Subsequently, the manufacturing data analysis device 200 controls, by the output data generation unit 214, an information amount and a display priority of the selected analysis result. Specifically, the analysis unit 213 may change the information amount and the display priority of the selected analysis result based on the index value $S_1$ ($y_i$, $x_j$) or $S_2$ ($y_i$, $x_j$) related to the selected analysis result. This changes a display mode of an image (analysis result display image) displaying each analysis result.

(Step S411) Subsequently, the manufacturing data analysis device 200 increments the variable j by 1 (j=j+1) by the analysis unit 213.

(Step S412) Here, the manufacturing data analysis device 200 determines whether or not the variable j is greater than M (j>M?) by the analysis unit 213. If this determination condition is satisfied (YES in step S412), the process proceeds to step S413. On the other hand, if this determination condition is not satisfied (NO in step S412), the process returns to step S404.

(Step S413) In this case, the manufacturing data analysis device 200 increments the variable i by 1 (i=i+1) by the analysis unit 213.

(Step S414) Here, the manufacturing data analysis device 200 determines whether or not the variable i is greater than N (i>N?) by the analysis unit 213. If this determination condition is satisfied (YES in step S414), the process proceeds to step S415. On the other hand, if this determination condition is not satisfied (NO in step S414), the process returns to step S403.

(Step S415) In this case, the manufacturing data analysis device 200 generates output data 250 including the analysis result by the output data generation unit 214. After this process, the manufacturing data analysis device 200 ends a series of processing.

FIG. 8 is a diagram showing a display example of a whole image based on the output data 250 according to the second embodiment. Here, an analysis target image 400 specifying an analysis target is displayed inside a whole display area 350 of the display device 300. On a lower side of the analysis target image 400, first analysis result display images 410, 420, 430, and 440 including the first analysis results for each piece of quality data $y_i$ are displayed. Preferably, these first analysis result display images 410, 420, 430, and 440 are arranged in parallel in the whole display area 350 so that the user can easily compare the first analysis results of the respective pieces of quality data $y_i$.

At an upper left edge of the first analysis result display image 410, an area 411 including a name (inspection item Y7) of a specific piece of quality data $y_i$ which is an analysis target is displayed. On a left side in the first analysis result display image 410, a first analysis information image 412 including first analysis information is displayed. The first analysis information is, for example, a numerical value or a chart concerning an anomaly degree of the quality data $y_i$. At an upper right edge of the first analysis result display image 410, an area 413 including a first index value (0.1) is displayed.

On a right side in the first analysis result display image 410, first analysis result display images 510, 520, and 530 including the first analysis result for each manufacturing condition data $x_j$ for the specific piece of quality data $y_i$ (inspection item Y7) which is the analysis target are displayed. Preferably, these first analysis result display images 510, 520, and 530 are arranged in parallel in the first analysis result display image 410 so that the user can easily compare the first analysis results for the respective manufacturing condition data $x_j$.

At an upper left edge of the first analysis result display image 510, an area 511 including a name (factor C5) of a specific piece of manufacturing condition data $x_j$ which is an analysis target is displayed. On a left side in the first analysis result display image 510, a second analysis information image 512 including second analysis information is displayed. The second analysis information is, for example, a numerical value or a chart related to a causality of the manufacturing condition data $x_j$ for an anomaly of the quality data $y_i$. At an upper right edge of the first analysis result display image 510, an area 513 including a first index value (0.8) is displayed.

On a right side in the first analysis result display image 510, a second analysis result display image 610 including a second analysis result of the specific piece of quality data y, (inspection item Y7) and the specific piece of manufacturing condition data $x_j$ (factor C5) which are the analysis targets is displayed. In this example, the second analysis result display image 610 forms a shape of a speech balloon referring to the second analysis information image 512.

In the center of the second analysis result display image 610, an additional analysis information image 611 including information (additional analysis information) on a result of additional analysis on the second analysis information by the manufacturing data 140 for additional analysis is displayed. At an upper right edge of the second analysis result display image 610, an area 612 including a second index value (0.7) is displayed.

Different information amounts and display priorities are set to each of the first analysis result display images 410, 420, 430, and 440. Firstly, "information amount: large, display priority: high" is set to the first analysis result display image 410. Secondly, "information amount: medium, display priority: medium" is set to the first analysis result display image 420. Third, "information amount: medium, display priority: low" is set to the first analysis result display image 430. Fourth, "information amount: small, display priority: low" is set to the first analysis result display image 440. A display mode of each of these first analysis result display images 410, 420, 430, and 440 is changed based on the information amount and display priority set for each.

Similarly, different information amounts and display priorities are set to each of the first analysis result display images 510, 520, and 530. Firstly, "information amount: large, display priority: high" is set to the first analysis result display image 510. Secondly, "information amount: small, display priority: middle" is set to the first analysis result display image 520. Third, "information amount: none, display priority: low" is set to the first analysis result display image 530. A display mode of each of these first analysis result display images 510, 520, and 530 is changed based on the information amount and display priority set for each.

In this example, a display area of each of the first analysis result display images 410, 420, 430, 440, 510, 520, and 530 is enlarged so that the larger the information amount set for each, the more information can be displayed. For example, the display area of the first analysis result display image 410 is enlarged compared to the other first analysis result display images 420, 430, and 440. Similarly, the display area of the first analysis result display image 510 is enlarged compared to the other first analysis result display images 520 and 530.

On the other hand, the first analysis result display images 410, 420, 430, 440, 510, 520, and 530 are placed in an upper row in the whole display area 350 so that the higher the display priority set for each, the greater the priority the user has to view its contents.

Furthermore, in the first analysis result display images 410, 420, 430, 440, 510, 520, and 530, display modes (e.g., type, color, and thickness) of frame borders of the areas showing the names of the pieces of quality data $y_i$ and the pieces of manufacturing condition data $x_j$ and frame borders of the areas showing the index values may be changed according to a magnitude of the index value ($S_1$ ($y_i$, $x_j$)) included in each of the images. For example, the colors of the frame borders of both areas in the first analysis result display images 410, 420, 430, and 440 are changed to red, yellow, black, and gray, respectively, in that order. Similarly, the colors of the frame borders of both areas in the first analysis result display images 510, 520, and 530 can be changed to red, yellow, and gray, respectively, in that order.

Similarly, in the second analysis result display image 610, according to a magnitude of the index value ($S_2$ ($y_i$, $x_j$)) included in itself, a display mode of a frame border of the area 612 showing that index value may be changed. For example, the color of the frame border of the area 612 is changed to red.

Among the first analysis result display images 410, 420, 430, and 440, the index value (<0.001) included in the first analysis result display image 440 is the smallest. Similarly, among the first analysis result display images 510, 520, and 530, the index value (<0.1) included in the first analysis result display image 530 is the smallest. That is, the first analysis result display images 440 and 530 include relatively insignificant information, so the text within the respective display areas may be displayed thin. That is, the opacity of the text indicating each analysis result can be changed according to the index value related to each analysis result.

FIG. 9 is a diagram showing a display example of a part of the image based on the output data 250 according to the second embodiment. Here, the additional analysis information image 611 shown in FIG. 8 is indicated in an enlarged manner.

The additional analysis information image 611 is a histogram that takes values of the specific pieces of manufacturing condition data $x_j$ (factor C5) on an abscissa axis and values of the specific pieces of quality data $y_i$ (inspection item Y7) on an ordinate axis. In the additional analysis information image 611, a predetermined threshold value TH1 and another threshold value TH2, which is smaller than this threshold value TH1, for the values of the quality data $y_i$ are respectively indicated by dashed lines. In this example, if a value of the quality data $y_i$ is within the threshold values TH1 and TH2, the value is determined to be a normal value. On the other hand, if a value of the quality data $y_i$ is outside the range of the threshold values TH1 and TH2, the value is determined to be an anomalous value. The respective values of the quality data $y_i$ correspond to circled data points 611A.

In the histogram shown by the additional analysis information image 611, all data points 611A belonging to a class determined to have no anomalous values are displayed in a predetermined color (e.g., gray). On the other hand, all data points 611A belonging to a class determined to have an anomalous value are identifiably highlighted by a predetermined color (e.g., red). With such a display mode, a user viewing the additional analysis information image 611 can easily and intuitively recognize the class having an anomalous value, etc.

The manufacturing data analysis system 1 according to the second embodiment has been described above. According to the second embodiment, the manufacturing data analysis device 200 calculates each of a first analysis result for manufacturing data 130 for analysis acquired under a first data acquisition condition AC1 and a second analysis result for manufacturing data 140 for additional analysis acquired under a second data acquisition condition AC2. Further, the manufacturing data analysis device 200 selects at least either one of the first analysis result or the second analysis result, and generates output data 250 including the selected analysis result. At this time, the manufacturing data analysis device 200 generates the output data 250 in which an information amount and a display priority of that analysis result are changed based on an index value indicating a strength of a relationship between manufacturing condition data $x_j$ and quality data $y_i$ related to the selected analysis result.

Therefore, the manufacturing data analysis device 200 according to the second embodiment can preferentially present, among a plurality of analysis results from combinations of multiple manufacturing condition data and multiple pieces of quality data, a specific analysis result with a relatively strong relationship between the two pieces of data. The manufacturing data analysis device 200 can also simultaneously present an additional analysis result with respect to that specific analysis result. The user can recognize a more accurate analysis result by comparing both analysis results at the same time.

Third Embodiment

FIG. 10 is a block diagram showing a functional configuration example of a manufacturing data analysis system 1 according to a third embodiment. Unlike the first embodiment, a manufacturing data analysis device 200 according to the third embodiment acquires a first data acquisition condition AC1, target manufacturing condition data x, a comparative manufacturing condition data group X', and a quality data group Y as the parameters 120. Further, the manufacturing data analysis device 200 according to the third embodiment includes a determination unit 215.

The comparative manufacturing condition data group X' is a group (set) including one or more pieces of manufacturing condition data to be compared with the target manufacturing condition data x. In the comparative manufacturing condition data group X', for example, one or more pieces of manufacturing condition data excluding the target manufacturing condition data x are specified from the plurality of pieces of manufacturing condition data included in the manufacturing data 110. For convenience of explanation, the number of pieces of manufacturing condition data (number of items) included in the comparative manufacturing condition data group X' will be hereinafter represented as "M". Also, each of the pieces of manufacturing condition data (comparative manufacturing condition data) included in the comparative manufacturing condition data group X' will be represented as "x'j" (variable j=1 . . . M; j is an integer).

As described above, the target manufacturing condition data x is manufacturing condition data that is a subject of the user's attention and is also manufacturing condition data to be analyzed by the manufacturing data analysis device 200. As described above, the quality data group Y is a group (set) including one or more pieces of quality data. For convenience of explanation, the number of pieces of quality data (number of items) included in the quality data group Y will be hereinafter represented as "N". Also, each of the pieces of quality data included in the quality data group Y will be represented as "$y_i$" (variable i=1 . . . N; i is an integer).

The acquisition unit 211 acquires manufacturing data 130 for analysis including a manufacturing condition data group X including the target manufacturing condition data x and the comparative manufacturing condition data group X' and the quality data group Y from the manufacturing data 110 included in the manufacturing DB 100 under the first data acquisition condition AC1 based on externally input parameters 120. The acquisition unit 211 outputs the manufacturing data 130 for analysis to the acquisition condition determination unit 212 and the analysis unit 213.

The analysis unit 213 analyzes the manufacturing data 130 for analysis and manufacturing data 140 for additional analysis input from the acquisition unit 211, and calculates a degree of influence S ($y_i$, x) exerted by the target manufacturing condition data x included in the manufacturing condition data group X on each of the pieces of quality data $y_i$ included in the quality data group Y. Similarly, the analysis unit 213 calculates a degree of influence S ($y_i$, x) exerted by the comparative manufacturing condition data $x'_j$ included in the comparative manufacturing condition data group X' on each of the pieces of quality data $y_i$ included in the quality data group Y. The analysis unit 213 outputs the index values S ($y_i$, x) and S ($y_i$, $x'_j$) as analysis results to the determination unit 215 and the output data generation unit 214.

In the present embodiment, the index value S ($y_i$, x) is the same as the degree of influence S ($y_i$, x) described above. That is, the degree of influence S ($y_i$, x) may be an index value indicating a strength of a relationship between the target manufacturing condition data x and target quality data y.

If, among one or more degrees of influence S ($y_i$, x) or S ($y_i$, $x'_j$) input from the analysis unit 213, one or more degrees of influence S ($y_i$, x) or S ($y_i$, $x'_j$) are equal to or greater than a predetermined threshold value, the determination unit 215 determines that these one or more degrees of influence S ($y_i$, x) or S ($y_i$, $x'_j$) satisfy a predetermined determination condition. Conversely, if, among one or more degrees of influence S ($y_i$, x) or S ($y_i$, $x'_j$), all the degrees of influence S ($y_i$, x) or S ($y_i$, $x'_j$) are less than the predetermined threshold value, the determination unit 215 determines that none of the degrees of influence S ($y_i$, x) or S ($y_i$, $x'_j$) satisfies the predetermined determination condition. This determination condition or threshold value may be the same or different for each of the degrees of influence S ($y_i$, x) and S ($y_i$, $x'_j$). The determination unit 215 outputs a determination result of each of the degrees of influence S ($y_i$, x) and S ($y_i$, $x'_j$) to the output data generation unit 214.

The output data generation unit 214 generates output data 250 based on the analysis results input from the analysis unit 213 and the determination results input from the determination unit 215. For example, if, among one or more pieces of quality data $y_i$ included in the quality data group Y, one or more pieces of quality data $y_i$ exist on which the target manufacturing condition data x or the comparative manufacturing condition data $x'_j$ has exerted a degree of influence S ($y_i$, x) or S ($y_i$, $x'_j$) that satisfies a predetermined determination condition or threshold value, the output data generation unit 214 generates the output data 250 including a content related to at least one of the target manufacturing condition data x or the comparative manufacturing condition data $x'_j$, this quality data $y_i$, or the degree of influence S ($y_i$, x) or S $(y_i, x'_j)$. This determination condition or threshold value may be the same or different for each of the degrees of influence S $(y_i, x)$ and S $(y_i, x'_j)$. Specifically, if a determination result to the effect that "a degree of influence S $(y_i, x)$ satisfies a first determination condition" is associated with an analysis result of the target manufacturing condition data x and predetermined quality data $y_i$, the output data generation unit 214 may include this analysis result in the output data 250. Similarly, if a determination result to the effect that "a degree of influence S $(y_i, x'_j)$ satisfies a second determination condition" is associated with an analysis result of the comparative manufacturing condition data $x'_j$ and the predetermined quality data $y_i$, the output data generation unit 214 may include this analysis result in the output data 250. The output data generation unit 214 outputs the output data 250 to the display device 300.

FIG. 11 is a flowchart showing an operation example of the manufacturing data analysis device 200 according to the third embodiment. Similar to the operation example in FIG. 2, the present operation example can be initiated when the user of the manufacturing data analysis device 200 or an external system inputs the parameters 120 into the manufacturing data analysis device 200.

(Step S501) First, the manufacturing data analysis device 200 acquires, by the acquisition unit 211, a first data acquisition condition AC1, target manufacturing condition data x, a comparative manufacturing condition data group X', and a quality data group Y as the parameters 120.

(Step S502) Next, the manufacturing data analysis device 200 acquires, by the acquisition unit 211, manufacturing data 130 for analysis from the manufacturing data 110 included in the manufacturing DB 100 based on the parameters 120.

(Step S503) Subsequently, the manufacturing data analysis device 200 sets the variable i to 1 (i=1) by the analysis unit 213. Specifically, the analysis unit 213 sets the variable i to 1 for the quality data $y_i$ included in the quality data group Y.

(Step S504) Subsequently, the manufacturing data analysis device 200 sets the variable j to 1 (j=1) by the analysis unit 213. Specifically, the analysis unit 213 sets the variable j to 1 for the comparative manufacturing condition data $x'_j$ included in the comparative manufacturing condition data group X'.

(Step SUB1) Subsequently, the manufacturing data analysis device 200 performs analysis processing of manufacturing data for analysis by the analysis unit 213.

(Step S505) Subsequently, the manufacturing data analysis device 200 determines, by the acquisition condition determination unit 212, a second data acquisition condition AC2 based on the manufacturing condition data $x_j$ included in the manufacturing data 130 for analysis. The "manufacturing condition data $x_j$" refers to the comparative manufacturing condition data $x'_j$ included in the comparative manufacturing condition data group X' and the target manufacturing condition data x. That is, the acquisition condition determination unit 212 may determine the second data acquisition condition AC2 based on the comparative manufacturing condition data $x'_j$ and the target manufacturing condition data x included in the manufacturing data 130 for analysis.

(Step S506) Subsequently, the manufacturing data analysis device 200 acquires, by the acquisition unit 211, manufacturing data 140 for additional analysis based on the second data acquisition condition AC2.

(Step SUB2) Subsequently, the manufacturing data analysis device 200 performs analysis processing of manufacturing data for additional analysis by the analysis unit 213.

(Step S507) Subsequently, the manufacturing data analysis device 200 selects, by the output data generation unit 214, either one or both of a first analysis result and a second analysis result, and includes the selected analysis result in output data 250.

(Step S508) Subsequently, the manufacturing data analysis device 200 increments the variable j by 1 (j=j+1) by the analysis unit 213.

(Step S509) Here, the manufacturing data analysis device 200 determines whether or not the variable j is greater than M (j>M?) by the analysis unit 213. If this determination condition is satisfied (YES in step S509), the process proceeds to step S510. On the other hand, if this determination condition is not satisfied (NO in step S509), the process returns to step SUB1.

(Step S510) In this case, the manufacturing data analysis device 200 increments the variable i by 1 (i=i+1) by the analysis unit 213.

(Step S511) Here, the manufacturing data analysis device 200 determines whether or not the variable i is greater than N (i>N?) by the analysis unit 213. If this determination condition is satisfied (YES in step S511), the process proceeds to step S512. On the other hand, if this determination condition is not satisfied (NO in step S511), the process returns to step S504.

(Step S512) In this case, the manufacturing data analysis device 200 generates, by the output data generation unit 214, the output data 250 including the analysis result. After this process, the manufacturing data analysis device 200 ends a series of processing.

FIG. 12 is a flowchart showing an example of the manufacturing data analysis processing according to the third embodiment. This processing is a subroutine for steps SUB1 and SUB2 in FIG. 11. That is, the same processing is performed for the manufacturing data 130 for analysis and the manufacturing data 140 for additional analysis.

(Step S601) First, the manufacturing data analysis device 200 calculates, by the analysis unit 213, a degree of influence S $(y_i, x)$ of the target manufacturing condition data x on the quality data $y_i$.

(Step S602) Here, the manufacturing data analysis device 200 determines whether or not the degree of influence S $(y_i, x)$ satisfies a predetermined determination condition (first determination condition) by the determination unit 215. This determination condition may be a predetermined threshold value (first threshold value). That is, the determination unit 215 may determine that the degree of influence S $(y_i, x)$ satisfies the predetermined determination condition if the degree of influence S $(y_i, x)$ is equal to or greater than the predetermined threshold value. If this determination condition is satisfied (YES in step S602), the process proceeds to step S603. On the other hand, if this determination condition is not satisfied (NO in step S602), the process proceeds to step S604.

(Step S603) In this case, the manufacturing data analysis device 200 includes, by the output data generation unit 214, the contents (i.e., the analysis result) related to the target manufacturing condition data x, the quality data $y_i$, and the degree of influence S $(y_i, x)$ in the output data 250.

(Step S604) Subsequently, the manufacturing data analysis device 200 calculates, by the analysis unit 213, the degree of influence S $(y_i, x'_j)$ of the comparative manufacturing condition data $x'_j$ on the quality data $y_i$.

(Step S605) Here, the manufacturing data analysis device 200 determines whether or not the degree of influence S ($y_i$, $x'_j$) satisfies a predetermined determination condition (second determination condition) by the determination unit 215. This determination condition may be a predetermined threshold value (second threshold value). That is, the determination unit 215 may determine that the degree of influence S ($y_i$, $x'_j$) satisfies the predetermined determination condition if the degree of influence S ($y_i$, $x'_j$) is equal to or greater than the predetermined threshold value. If this determination condition is satisfied (YES in step S605), the process proceeds to step S606. On the other hand, if this determination condition is not satisfied (NO in step S605), the manufacturing data analysis device 200 ends the manufacturing data analysis processing.

(Step S606) In this case, the manufacturing data analysis device 200 includes, by the output data generation unit 214, the contents (i.e., the analysis result) related to the comparative manufacturing condition data $x'_j$, the quality data $y_i$, and the degree of influence S ($y_i$, $x'_j$) in the output data 250. After this step, the manufacturing data analysis device 200 ends a series of processing.

FIG. 13 is a diagram showing a first display example of an image based on the output data 250 according to the third embodiment. Here, a first display image 710 including an analysis result of one piece of quality data $y_i$ and a second display image 720 including an analysis result of another piece of quality data $y_i$ are displayed inside the whole display area 350 of the display device 300. Preferably, the first display image 710 and the second display image 720 are arranged in parallel in the whole display area 350 so that the user can easily compare the analysis results in both images.

The first display image 710 includes an area 711 at an upper left edge and areas 712, 713, 714, and 715 near the center. The area 711 displays a data name (dimension (vertical)) of the predetermined quality data $y_i$ which is an analysis target (investigation target). The area 712 displays a degree of influence S ($y_i$, x) (degree of influence 80) exerted by target manufacturing condition data x (member 1) which is an analysis target on the predetermined quality data $y_i$.

In the area 713, a data name (member 1) of the target manufacturing condition data x is displayed at an upper left edge, and as an analysis result of the target manufacturing condition data x and the quality data $y_i$, a scatter diagram based on both pieces of data is displayed near the center. In this scatter diagram, an abscissa axis indicates respective values (member 1G, member 1R, and member 1Y) of the target manufacturing condition data x, and an ordinate axis indicates respective values of the quality data $y_i$. A first threshold value TH1 and a second threshold value TH2, which is smaller than the first threshold value TH1, for the values of the quality data $y_i$ are respectively displayed by dashed lines. In particular, among the plurality of values of the pieces of quality data $y_i$, data points indicating values equal to or greater than the first threshold value TH1 are highlighted by being surrounded by a frame line of a predetermined color (e.g., red). With this display mode, the user can easily recognize anomalous values of the quality data $y_i$.

In the area 714, a degree of influence S ($y_i$, $x'_j$) (degree of influence 90) exerted by comparative manufacturing condition data $x'_j$ (member 3) which is a comparison target on the predetermined quality data $y_i$ is displayed. Various character modifications (e.g., font, color, size) may be applied to the characters representing the "degree of influence 90" so that they are highlighted.

In the area 715, a data name (member 3) of the comparative manufacturing condition data $x'_j$ is displayed at an upper left edge, and as an analysis result of the comparative manufacturing condition data $x'_j$ and the quality data $y_i$, a scatter diagram based on both pieces of data is displayed near the center. In this scatter diagram, an abscissa axis indicates respective values (member 3B, member 3R, and member 3G) of the comparative manufacturing condition data $x'_j$, and an ordinate axis indicates respective values of the quality data $y_i$.

On a right side of the area 715, a second analysis result display image 810 including a second analysis result of the specific piece of quality data $y_i$ (dimension (vertical)) and the specific comparative manufacturing condition data $x'_j$ (member 3) which are the analysis targets is displayed. In this example, the second analysis result display image 810 forms a shape of a speech balloon referring to the area 715.

The second analysis result display image 810 includes an area 811 at an upper portion and an area 812 near the center. The area 811 displays a degree of influence S ($y_i$, $x'_j$) (degree of influence 50) exerted by the comparative manufacturing condition data $x'_j$ (member 3) which is the analysis target on the predetermined quality data $y_i$.

In the area 812, a data name (member 3) of the comparative manufacturing condition data $x'_j$ is displayed at an upper left edge, and as an analysis result of the comparative manufacturing condition data $x'_j$ and the quality data $y_i$, a scatter diagram based on both pieces of data is displayed near the center. Here, in the scatter diagram in the area 812, the number of pieces of data related to the value "3R" is increased as compared to the scatter diagram in the area 715. That is, as a result of the additional analysis with that increased number of pieces of data, the value of the degree of influence S ($y_i$, $x'_j$) has changed from "90" to "50" after recalculation.

On the other hand, in the second display image 720, a data name (weight) of quality data $y_i$ is displayed at a left end, and a degree of influence S ($y_i$, x) (degree of influence 50) of the target manufacturing condition data x (member 1) is displayed near the center. Here, detailed analysis results may be displayed by the user selecting the second display image 720.

FIG. 14 is a diagram showing a second display example of the image based on the output data 250 according to the third embodiment. Unlike the display example in FIG. 13, the display example in FIG. 14 shows degrees of reliability of the respective analysis results in addition to the values of the degrees of influence S ($y_i$, x) and S ($y_i$, $x'_j$). It suffices that the degrees of reliability are calculated by the above-described method in the above-described manufacturing data analysis processing.

Firstly, the area 712 displays a degree of reliability (70%) related to the analysis result of the target manufacturing condition data x and the quality data $y_i$. Secondly, the area 714 displays a degree of reliability (10%) related to the analysis result of the comparative manufacturing condition data $x'_j$ and the quality data $y_i$. Third, the area 811 displays a degree of reliability (80%) related to the additional analysis result of the comparative manufacturing condition data $x'_j$ and the quality data $y_i$. This display mode allows the user to objectively evaluate the degree of reliability of each analysis result.

FIG. 15 is a diagram showing a third display example of the image based on the output data 250 according to the third embodiment. Unlike the display example in FIG. 13, in the display example in FIG. 15, the second analysis result display image 810 includes areas 813 and 814 in addition to the areas 811 and 812.

In the area 813, a degree of influence S ($y_i$, x) (degree of influence 80) exerted by the target manufacturing condition data x (member 1) which is the analysis target (investigation target) on the predetermined quality data $y_i$ is displayed.

In the area 814, the data name (member 1) of the target manufacturing condition data x is displayed at an upper left edge, and, as an additional analysis result of the target manufacturing condition data x and the quality data $y_i$, a scatter diagram based on both pieces of data is displayed near the center. This scatter diagram shows respective values (member 1B, member 1G, member 1R, and member 1Y) of the target manufacturing condition data x, and an ordinate axis indicates the respective values of the quality data $y_i$. Here, in the scatter diagram in the area 814, data related to a new value "1B" is added as compared to the scatter diagram in the area 713. That is, the value of the degree of influence S ($y_i$, x) does not change from "80" after recalculation as a result of the additional analysis with the new data added.

The manufacturing data analysis system 1 according to the third embodiment has been described above. According to the third embodiment, the manufacturing data analysis device 200 can detect quality data $y_i$ with a relatively large degree of influence S ($y_i$, x) or S ($y_i$, $x'_j$) exerted by the target manufacturing condition data x or the comparative manufacturing condition data $x'_j$ specified by the user, etc. among all the quality data $y_i$ specified by the user, etc. At this time, the manufacturing data analysis device 200 can reduce the number of pieces of display data by not outputting an analysis result for quality data with a relatively small degree of influence exerted by a predetermined manufacturing condition. This allows the manufacturing data analysis device 200 to reduce man-hours required for the user to investigate an influence of a predetermined manufacturing condition on all the quality data and man-hours required to interpret results of this investigation. The manufacturing data analysis device 200 according to the third embodiment can also provide the same advantageous effect as that of the first embodiment.

FIG. 16 is a block diagram showing a hardware configuration example of the manufacturing data analysis system 1 according to the first to third embodiments. In particular, the manufacturing data analysis device 200 includes processing circuitry 210, a memory 220, an input IF 230, and a communication IF 240 as hardware resources.

The processing circuitry 210 controls the operation of the manufacturing data analysis device 200. The processing circuitry 210 has processors such as a central processing unit (CPU), a micro processing unit (MPU), and a graphics processing unit (GPU) as hardware resources. For example, the processing circuitry 210 executes each program developed in the memory 220 via at least one processor to realize each unit (acquisition unit 211, acquisition condition determination unit 212, analysis unit 213, output data generation unit 214, or determination unit 215) corresponding to each program. Each unit can be realized by processing circuitry 210 consisting of a single processor or a combination of multiple processors.

The memory 220 stores information such as data and programs used by the processing circuitry 210. The memory 220 has a semiconductor memory element such as a random access memory (RAM) as a hardware resource. The memory 220 may be a drive device that reads and writes information from and to an external storage device such as a magnetic disk (floppy (registered trademark) disk, hard disk), a magneto-optical disk (MO), an optical disk (CD, DVD, Blu-ray (registered trademark)), a flash memory (USB flash memory, memory card, SSD), and a magnetic tape. A storage area of the memory 220 may be inside the manufacturing data analysis device 200 or in an external storage device. The memory 220 is an example of a storage unit.

The input IF 230 is an interface that accepts an input from a user of the manufacturing data analysis device 200, converts the accepted input into an electrical signal, and outputs it to the processing circuitry 210. Physical operating components such as a mouse, a keyboard, a trackball, a switch, a button, a joystick, a touch pad, a touch panel display, and a microphone can be used as the input IF 230. The input IF 230 may be a device that accepts an input from an external input device that is separate from the manufacturing data analysis device 200, converts the accepted input into an electrical signal, and outputs it to the processing circuitry 210. The input IF 230 may also accept an input of the parameters 120 by the user, etc. The input IF 230 is an example of an input unit.

The communication IF 240 is an interface that communicates various types of data between the manufacturing data analysis device 200 and external devices. Any communication standard can be used for this data communication. The communication IF 240 is communicably connected to the manufacturing DB 100 and the display device 300. The communication IF 240 is an example of a communication unit.

The display device 300 displays data generated by the manufacturing data analysis device 200, data stored in the memory 220, etc. As the display device 300, for example, a display such as a cathode ray tube (CRT) display, a liquid crystal display (LCD), a plasma display, an organic electroluminescence display (OELD), and a tablet terminal can be used. The display device 300 may be included in the manufacturing data analysis device 200. The display device 300 is an example of a display unit.

In FIGS. 13 to 15, each value (member 1B, member 1G, member 1R, and member 1Y) included in the target manufacturing condition data x (member 1) is marked with a "gear" icon, while each value (member 3B, member 3R, and member 3G) included in the comparison manufacturing condition data $x'_j$ (member 3) is marked with a "spiral" icon. These icons are attached to the respective values for convenience in explaining the operation of the manufacturing data analysis device 200 according to the third embodiment. That is, these icons may not actually be displayed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A manufacturing data analysis device comprising processing circuitry configured to:

acquire first manufacturing data from manufacturing data, wherein the manufacturing data includes pieces of data, and each of the pieces of data includes identification information for a plurality of products, and manufacturing condition data and quality data associated with the identification information, and wherein the first manufacturing data corresponds to a first acquisition condition indicating a specific value or a range for the identification information, the manufacturing condition data, or the quality data;

determine a second acquisition condition different from the first acquisition condition and including at least a part of the first acquisition condition, based on the first manufacturing data;

acquire second manufacturing data from the manufacturing data, wherein the second manufacturing data corresponds to the second acquisition condition;

calculate a first analysis result for manufacturing data acquired under the first acquisition condition and the quality data;

calculate, for additional analysis, a second analysis result for manufacturing data acquired under the second acquisition condition different from the first acquisition condition and including at least a part of the first acquisition condition;

generate output data related to the first analysis result and additional output data related to the second analysis result; and present, simultaneously, the output data related to the first analysis result and the additional output data related to the second analysis result for a user.

2. The manufacturing data analysis device according to claim 1, wherein the processing circuitry is configured to:

calculate an analysis result of a relationship between the manufacturing data and the quality data by analyzing the first manufacturing data; and generate the output data further including the analysis result for the first manufacturing data.

3. The manufacturing data analysis device according to claim 1, wherein the processing circuitry is configured to determine the second acquisition condition so that bias in distribution of a plurality of values included in the manufacturing condition data or the quality data in the first manufacturing data can be reduced.

4. The manufacturing data analysis device according to claim 1, wherein the processing circuitry is configured to, if the manufacturing condition data or the quality data is qualitative data, determine the second acquisition condition so that the number of pieces of data for each type of values included in the qualitative data is equal to or greater than a predetermined threshold value.

5. The manufacturing data analysis device according to claim 1, wherein the processing circuitry is configured to, if the manufacturing condition data or the quality data is quantitative data, determine the second acquisition condition so that a frequency for each class of values included in the quantitative data is equal to or greater than a predetermined threshold value.

6. The manufacturing data analysis device according to claim 1, wherein the processing circuitry is configured to calculate a first degree of reliability related to the first manufacturing data and determine the second acquisition condition based on the first degree of reliability.

7. The manufacturing data analysis device according to claim 6, wherein the processing circuitry is configured to calculate a second degree of reliability related to the second manufacturing data and determine the second acquisition condition so that the second degree of reliability is higher than the first degree of reliability.

8. The manufacturing data analysis device according to claim 1, wherein the processing circuitry is configured to acquire, from the manufacturing data, the first manufacturing data under the first acquisition condition, the first manufacturing data including a manufacturing condition data group including a plurality of pieces of manufacturing condition data and a quality data group including a plurality of pieces of quality data, the manufacturing condition data group includes first manufacturing condition data and second manufacturing condition data different from the first manufacturing condition data, and the processing circuitry is configured to:

determine the second acquisition condition based on the first manufacturing data;

acquire the second manufacturing data including the manufacturing condition data group and the quality data group from the manufacturing data under the second acquisition condition;

calculate a first degree of influence exerted by the first manufacturing condition data on each of the pieces of quality data and a second degree of influence exerted by the second manufacturing condition data on each of the pieces of quality data by analyzing the first manufacturing data and the second manufacturing data; and generate first output data including a content related to at least one of the first manufacturing condition data, quality data on which the first manufacturing condition data has exerted the first degree of influence satisfying a first determination condition, or the first degree of influence satisfying the first determination condition, and generate second output data including a content related to at least one of the second manufacturing condition data, quality data on which the second manufacturing condition data has exerted the second degree of influence satisfying a second determination condition, or the second degree of influence satisfying the second determination condition.

9. The manufacturing data analysis device according to claim 8, further comprising a display device configured to display the second output data obtained by analyzing the second manufacturing data.

10. The manufacturing data analysis device according to claim 8, further comprising a display device configured to display the first output data or the second output data including a degree of reliability of each analysis result.

11. The manufacturing data analysis device according to claim 8, further comprising a display device configured to display the first output data obtained by analyzing the first manufacturing data.

12. The manufacturing data analysis device according to claim 1, wherein the first acquisition condition includes at least one of a product number, a list of product numbers, a time or a time period when a product is processed or inspected, a lot number, a material name or a device name, a list of material names or device names, or a size, a weight, electrical characteristics, or physical characteristics of a product.

13. The manufacturing data analysis device according to claim 1, wherein the second acquisition condition is a condition to acquire a greater number of the pieces of data from the manufacturing data than the first acquisition condition.

14. The manufacturing data analysis device according to claim 1, wherein the output data includes a diagram in which a first axis indicates the manufacturing condition data and a second axis indicates the quality data.

15. A manufacturing data analysis device comprising processing circuitry configured to:

acquire first manufacturing data from manufacturing data, wherein the manufacturing data includes pieces of data, and each of the pieces of data includes identification information for a plurality of products, and manufacturing condition data and quality data associated with the identification information, and wherein the first manufacturing data corresponds to a first acquisition condition indicating a specific value or a range for the identification information, the manufacturing condition data, or the quality data;

determine a second acquisition condition different from the first acquisition condition and including at least a part of the first acquisition condition, based on the first manufacturing data;

acquire second manufacturing data from the manufacturing data, wherein the second manufacturing data corresponds to the second acquisition condition;

calculate a first analysis result of a relationship between the manufacturing condition data and the quality data by analyzing the first manufacturing data, and calculate, for additional analysis, a second analysis result of the relationship between the manufacturing condition data and the quality data by analyzing the second manufacturing data;

select at least one of the first analysis result or the second analysis result;

generate output data related to the first analysis result and additional output data related to the second analysis result; and present, simultaneously, the output data related to the first analysis result and the additional output data related to the second analysis result for a user.

16. The manufacturing data analysis device according to claim 15, wherein the first analysis result and the second analysis result each include an index value indicating a strength of the relationship between the manufacturing condition data and the quality data, and the processing circuitry is configured to select the first analysis result or the second analysis result, whichever index value is larger.

17. The manufacturing data analysis device according to claim 16, wherein the processing circuitry is configured to generate the output data in which an information amount and/or display priority of the selected analysis result is changed based on the index value included in the selected analysis result.

18. The manufacturing data analysis device according to claim 17, wherein the processing circuitry is configured to generate the output data so that, as the information amount becomes larger, a display area for the selected analysis result is enlarged in the output data.

19. The manufacturing data analysis device according to claim 17, wherein the processing circuitry is configured to generate the output data so that, as the display priority becomes higher, a display area for the selected analysis result is placed in an upper row in the output data.

20. A manufacturing data analysis method comprising:

acquiring first manufacturing data from manufacturing data, wherein the manufacturing data includes pieces of data, and each of the pieces of data includes identification information for a plurality of products, and manufacturing condition data and quality data associated with the identification information, and wherein the first manufacturing data corresponds to a first acquisition condition indicating a specific value or a range for the identification information, the manufacturing condition data, or the quality data;

determining a second acquisition condition different from the first acquisition condition and including at least a part of the first acquisition condition, based on the first manufacturing data;

acquiring second manufacturing data from the manufacturing data, wherein the second manufacturing data corresponds to the second acquisition condition;

calculating a first analysis result for manufacturing data acquired under the first acquisition condition and the quality data;

calculate, for additional analysis, a second analysis result for manufacturing data acquired under the second acquisition condition different from the first acquisition condition and including at least a part of the first acquisition condition;

generating output data related to the first analysis result and additional output data related to the second analysis result; and present, simultaneously, the output data related to the first analysis result and the additional output data related to the second analysis result for a user.

* * * * *